US012682582B2

(12) United States Patent
Stockhammer et al.

(10) Patent No.: US 12,682,582 B2
(45) Date of Patent: Jul. 14, 2026

(54) SYSTEMS AND METHODS FOR PASS-THROUGH EXTENDED REALITY (XR) CONTENT

(71) Applicant: QUALCOMM Incorporated, San Diego, CA (US)

(72) Inventors: Thomas Stockhammer, Bergen (DE); Imed Bouazizi, Frisco, TX (US); Bojan Vrcelj, San Diego, CA (US); Prashanth Haridas Hande, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 18/429,149

(22) Filed: Jan. 31, 2024

(65) Prior Publication Data

US 2024/0273829 A1 Aug. 15, 2024

Related U.S. Application Data

(60) Provisional application No. 63/445,618, filed on Feb. 14, 2023.

(51) Int. Cl.
*G06T 19/00* (2011.01)
*G06T 7/70* (2017.01)
*H04L 67/04* (2022.01)

(52) U.S. Cl.
CPC .............. *G06T 19/006* (2013.01); *G06T 7/70* (2017.01); *H04L 67/04* (2013.01); *G06T 2207/10021* (2013.01)

(58) Field of Classification Search
CPC .................................................... G06T 19/006
See application file for complete search history.

(56) References Cited

U.S. PATENT DOCUMENTS

2014/0354690 A1* 12/2014 Walters ................. G06T 19/003
345/633
2018/0075654 A1* 3/2018 Vembar ..................... G06T 7/70
(Continued)

OTHER PUBLICATIONS

3GPP TR 26.998: "3rd Generation Partnership Project, Technical Specification Group Services and System Aspects, Support of 5G Glass-type Augmented Reality / Mixed Reality (AR/MR) Devices, (Release 18)", 3GPP TR 26.998 V18.0.0, Dec. 2022, pp. 1-121, pp. 15-35, p. 60, p. 116-p. 118.
(Continued)

*Primary Examiner* — Charles Tseng
(74) *Attorney, Agent, or Firm* — Polsinelli LLP

(57) ABSTRACT

Extended reality (XR) management systems and techniques are described. In some examples, an XR management system receives sensor data from an XR interface device having at least one sensor. The XR management system generates, based on the receipt of the sensor data from the XR interface device, processing instructions for an XR processing device to process the sensor data to generate XR content. The XR management system sends the sensor data and the processing instructions to the XR processing device. The XR management system receives the XR content from the XR processing device. The XR management system generates layer content. The XR management system sends the XR content and the layer content to the XR interface device to cause the XR interface device to output the XR content and the layer content in a layered arrangement.

20 Claims, 15 Drawing Sheets

(56) References Cited

U.S. PATENT DOCUMENTS

2019/0260870 A1*  8/2019  Spivack .................. G06F 3/011
2021/0185294 A1    6/2021  Malaika

OTHER PUBLICATIONS

International Search Report and Written Opinion—PCT/US2024/014041—ISA/EPO—May 3, 2024.

* cited by examiner

/300

3rd Camera 330C   4th Camera 330D   Display(s) 340

Earpiece 335

1st Camera 330A

HMD 310

2nd Camera 330B

/350

2nd Camera 330B

1st Camera 330A

HMD 310

User 320

Earpiece 335

400

Speaker 435A

1st Camera 430A

2nd Camera 430B

Display 440

Mobile handset 410
(front surface 420)

450

3rd Camera 430C

4th Camera 430D

Mobile handset 410
(rear surface 460)

Speaker 435B

700

Cell Subsystem 776

XR Mgmt System 704

Uplink Media 772

Downlink Media 774

MAF API 754

Media Access Fxns 760

User Input 748

XR App 746

Media & Sens. Data 752

Scene Desc. 756

Primitives Buffers 758

XR Scene API 750

XR Scene Mgr 742

XR Runtime API 740

XR Link Fxns 736

Comm. Interface 734

Teth. Cm. Intf. 732

Comm. Interface 730

XR Link Fxns 728

XR Interface Device 702

Cameras 710

Sensors 708

XR Runtime 712

Eye Buffer Display 720

Speakers 724

Microphones 726

900

XR Mgmt System 704

Cell Subsystem 776

Uplink Media 772

Downlink Media 774

MAF API 954

Media Access Fxns 760

User Input 748

XR App 746

Media & Sens. Data 752

Scene Desc. 756

Primitives Buffers 758

XR Scene API 750

XR Scene Mgr 742

XR Runtime API 744

Actions & Pose Decoder 940

Encoder 945
Formats 950
Security 955

Raw Formats 820

XR Link Fxns 736

Comm. Interface 734

Bitrate 925
Protocol 930
Security 935

Cm.Intf. 732

Bitrate 925
Protocol 930
Security 935

XR Interface Device 702

Comm. Interface 730

Cameras 710

Actions & Pose Encoder 905

XR Link Fxns 728

Decoder 910
Proj. Formats 915
Security 920

Sensors 708

XR Runtime 712

Microphones 726

Eye Buffer Display 720

Speakers 724

FIG. 9

1000

XR Mgmt System 704

Cell Subsystem 776

Uplink Media 772

Downlink

MAF API 1054

Media Access Fxns 760

User Input 748

XR App 746

Media & Sens. Data 752

Scene Data 756

Primitives Buffers 758

XR Scene API

XR Scene Mgr 742

XR Runtime API 7

Pass-Through Encoded Formats 1015 (e.g., Compressed, Encrypted)

Encoded Formats 1020

XR Link Fxns 736

Comm. Interface 7

XR Interface Device 702

Cm. Intf. 732

Comm. Interface 7

Cameras 710

Sensors 708

XR Runtime 712

XR Link Fxns

Decoder 1025
Proj. Formats 1030
Security 1035

Microphones 726

Eye Buffer Display 720

Speakers 724

FIG. 10

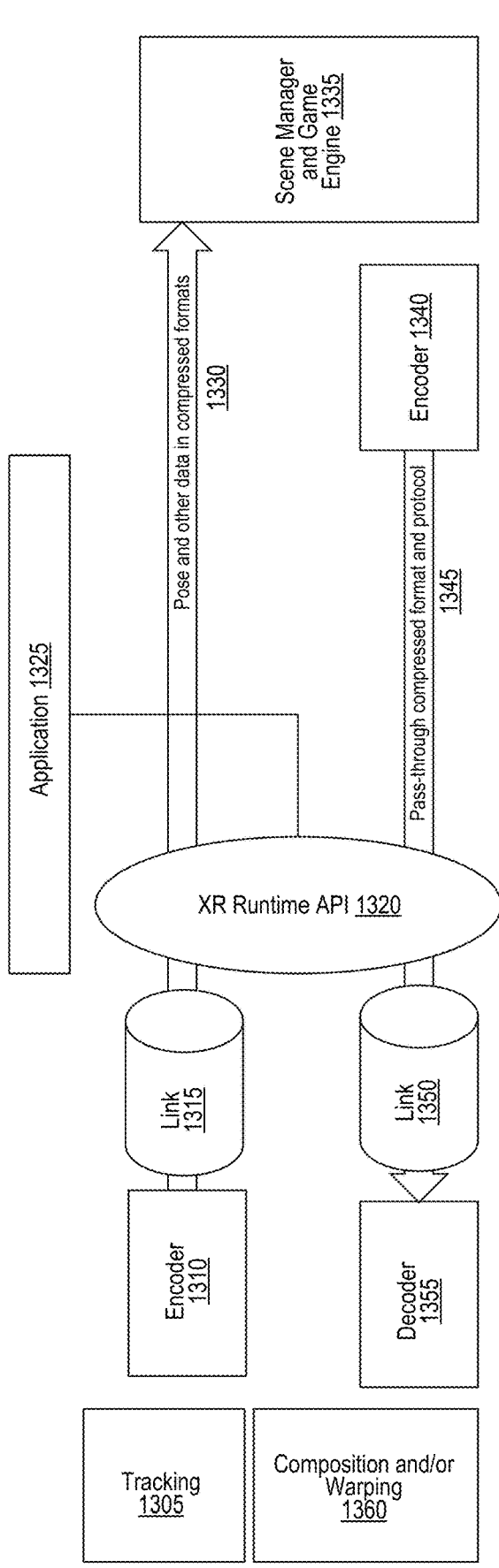
FIG. 13

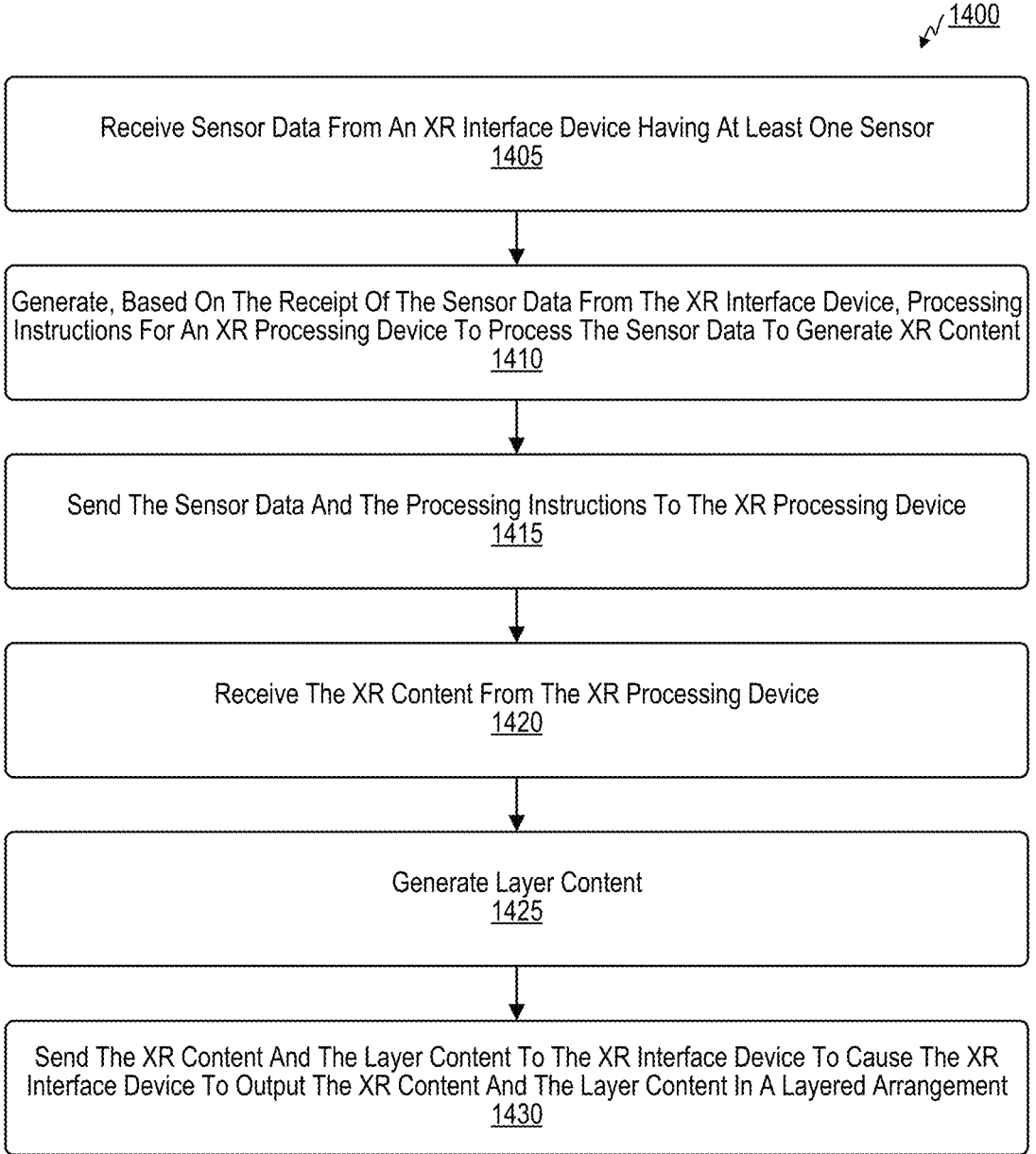

1400

Receive Sensor Data From An XR Interface Device Having At Least One Sensor
1405

Generate, Based On The Receipt Of The Sensor Data From The XR Interface Device, Processing Instructions For An XR Processing Device To Process The Sensor Data To Generate XR Content
1410

Send The Sensor Data And The Processing Instructions To The XR Processing Device
1415

Receive The XR Content From The XR Processing Device
1420

Generate Layer Content
1425

Send The XR Content And The Layer Content To The XR Interface Device To Cause The XR Interface Device To Output The XR Content And The Layer Content In A Layered Arrangement
1430

FIG. 14

SYSTEMS AND METHODS FOR PASS-THROUGH EXTENDED REALITY (XR) CONTENT

CROSS-REFERENCE TO RELATED APPLICATIONS

This application claims the benefit of U.S. Provisional Application No. 63/445,618, filed Feb. 14, 2023 and titled "Systems and Methods for Pass-through Compressed Media Formats for Extended Reality (XR) Runtimes," which is hereby incorporated by reference in its entirety and for all purposes.

FIELD

This application is related to imaging. More specifically, this application relates to systems and methods of split rendering and pass-through compressed media formats for extended reality (XR) systems.

BACKGROUND

Many devices include one or more cameras. For example, a smartphone or tablet includes a front facing camera to capture selfie images and a rear facing camera to capture an image of a scene (such as a landscape or other scenes of interest to a device user). A camera can capture images using an image sensor of the camera, which can include an array of photodetectors. Some devices can analyze image data captured by an image sensor to detect an object within the image data. Sometimes, cameras can be used to capture images of scenes that include one or more people.

BRIEF SUMMARY

Systems and techniques are described for extended reality (XR) management. In some examples, an XR management system receives sensor data from an XR interface device having at least one sensor. The sensor data can include, for instance, image(s) and/or video(s) captured using camera(s) of the XR interface device. The XR management system generates, based on the receipt of the sensor data from the XR interface device, processing instructions for an XR processing device to process the sensor data to generate XR content. The XR management system sends the sensor data and the processing instructions to the XR processing device. The XR management system receives the XR content from the XR processing device. In some examples, the processing instructions can instruct the XR processing device to limit a size or bit rate of the XR content based on (e.g., so as not to exceed) a bandwidth of a connection between the XR management system and the XR interface device, a quality of the connection, a resolution of the XR interface device's display screen, and/or another limitation. In some examples, the processing instructions can specify the XR interface device's pose (e.g., location and/or orientation), which can dictate location(s) and/or orientation(s) that the XR processing device renders virtual content (e.g., video game content) in within the context of the XR content. The XR management system generates layer content. The XR management system sends the XR content and the layer content to the XR interface device to cause the XR interface device to output the XR content and the layer content in a layered arrangement. In some examples, the layer content can be overlaid over the XR content according to the layered arrangement. In some examples, the XR content can be overlaid over the layer content according to the layered arrangement. For instance, the layer content can include communication(s), notification(s), alert(s), status indicator(s), or combinations thereof. In an illustrative example, the XR interface device is a headset (e.g., head-mounted display (HMD) device, glasses, wearable device), the XR management system is a mobile device (e.g., mobile handset, tablet, laptop, wearable device) that is locally coupled (e.g., wirelessly or using wire(s)) to the XR interface device, and the XR processing device is a remote computing system (e.g., an edge node, a remote server). In some examples, the XR interface device is a mobile device (e.g., mobile handset, tablet, laptop, wearable device).

According to at least one example, a method is provided for extended reality (XR) management. The method includes: receiving sensor data from an XR interface device having at least one sensor; generating, based on the receipt of the sensor data from the XR interface device, processing instructions for an XR processing device to process the sensor data to generate XR content; sending the sensor data and the processing instructions to the XR processing device; receiving the XR content from the XR processing device; generating layer content; and sending the XR content and the layer content to the XR interface device for the XR interface device to output the XR content and the layer content in a layered arrangement.

In another example, an apparatus for XR management is provided that includes at least one memory and at least one processor coupled to the at least one memory. The at least one processor is configured to: receive sensor data from an XR interface device having at least one sensor; generate, based on the receipt of the sensor data from the XR interface device, processing instructions for an XR processing device to process the sensor data to generate XR content; send the sensor data and the processing instructions to the XR processing device; receive the XR content from the XR processing device; generate layer content; and send the XR content and the layer content to the XR interface device for the XR interface device to output the XR content and the layer content in a layered arrangement.

In another example, a non-transitory computer-readable medium is provided that has stored thereon instructions that, when executed by one or more processors, cause the one or more processors to: receive sensor data from an XR interface device having at least one sensor; generate, based on the receipt of the sensor data from the XR interface device, processing instructions for an XR processing device to process the sensor data to generate XR content; send the sensor data and the processing instructions to the XR processing device; receive the XR content from the XR processing device; generate layer content; and send the XR content and the layer content to the XR interface device for the XR interface device to output the XR content and the layer content in a layered arrangement.

In another example, an apparatus for XR management is provided. The apparatus includes: means for receiving sensor data from an XR interface device having at least one sensor; means for generating, based on the receipt of the sensor data from the XR interface device, processing instructions for an XR processing device to process the sensor data to generate XR content; means for sending the sensor data and the processing instructions to the XR processing device; means for receiving the XR content from the XR processing device; means for generating layer content; and means for sending the XR content and the layer content to the XR interface device for the XR interface device to output the XR content and the layer content in a layered arrangement.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 9 is a block diagram illustrating a split rendering process, including encoding and decoding, in the context of the architecture of the extended reality (XR) system of FIG. 7, in accordance with some examples;

FIG. 10 is a block diagram illustrating a process for using passed-through encoded formats and/or protocols for remote rendering in the context of the architecture of the extended reality (XR) system of FIG. 7, in accordance with some examples;

FIG. 13 is a block diagram illustrating an example architecture of an extended reality (XR) system that performs XR management to pass compressed formats, in accordance with some examples;

FIG. 14 is a flow diagram illustrating a process for extended reality (XR) management, in accordance with some examples.

DETAILED DESCRIPTION

Figure 1:
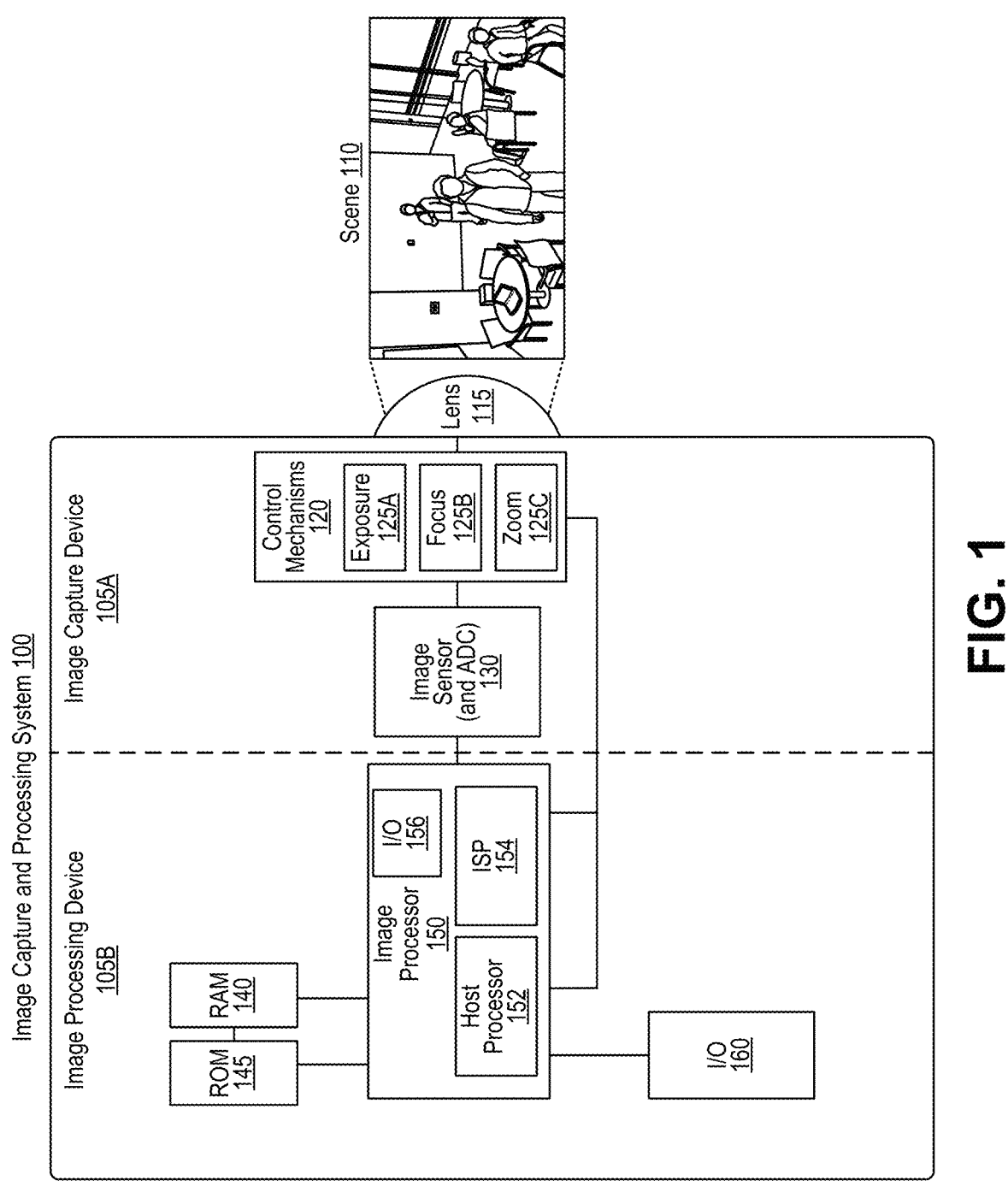
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A device that includes a camera can analyze image data captured by an image sensor to detect, recognize, classify, and/or track an object within the image data. For instance, by detecting and/or recognizing an object in multiple video frames of a video, the device can track movement of the object over time.

Extended reality (XR) management systems and techniques are described. XR management system receives sensor data from an XR interface device having at least one sensor. The sensor data can include, for instance, image(s) and/or video(s) captured using camera(s) of the XR interface device, depth data captured using depth sensor(s) of the XR interface device, pose data captured using sensor(s) for position and/or movement and/or orientation and/or acceleration, other sensor data from other types of sensors, or a combination thereof. The XR management system generates, based on the receipt of the sensor data from the XR interface device, processing instructions for an XR processing device to process the sensor data to generate XR content. The XR management system sends the sensor data and the processing instructions to the XR processing device. The XR management system receives the XR content from the XR processing device. In some examples, the processing instructions can instruct the XR processing device to limit a size or bit rate of the XR content based on (e.g., so as not to exceed) a bandwidth of a connection between the XR management system and the XR interface device, a quality of the connection, a resolution of the XR interface device's display screen, and/or another limitation. In some examples, the processing instructions can specify the XR interface device's pose (e.g., location and/or orientation), which can dictate location(s) and/or orientation(s) that the XR processing device renders virtual content (e.g., video game content) in within the context of the XR content. The XR content can be a processed variant of the sensor data, for instance with the virtual content rendered and integrated into an environment represented in the sensor data. The XR management system generates layer content, which is content to be added by the XR management system, for instance on another layer than the XR content (e.g., overlaid over the XR content or underlaid under the XR content), without having to directly modify (e.g., and thus decompress and/or decode and/or decrypt) the XR content at the XR management system. The XR management system sends the XR content and the layer content to the XR interface device to cause the XR interface device to output the XR content and the layer content in a layered arrangement. In some examples, the layer content can be overlaid over the XR content according to the layered arrangement. In some examples, the XR content can be overlaid over the layer content according to the layered arrangement. For instance, the layer content can include communication(s), notification(s), alert(s), status indicator(s), or combinations thereof. In an illustrative example, the XR interface device is a headset (e.g., head-mounted display (HMD) device, glasses, wearable device), the XR management system is a mobile device (e.g., mobile handset, tablet, laptop, wearable device) that is locally coupled (e.g., wirelessly or using wire(s)) to the XR interface device, and the XR processing device is a remote computing system (e.g., an edge node, a remote server). In some examples, the XR interface device is a mobile device (e.g., mobile handset, tablet, laptop, wearable device).

The XR management systems and techniques disclosed herein provide a number of technical improvements that solve a number of technical problems in XR systems (and in other systems that include a set of coupled devices). For instance, XR systems are sensitive to latency and quality. XR systems in which an XR management system (e.g., XR management system 1104) transcodes (e.g., decodes, encodes, decompresses, compresses, decrypts, and/or encrypts) content (e.g., sensor data and/or XR content) between an XR interface device (e.g., XR interface device 1102) and an XR processing device (e.g., XR processing device 1106) introduce latency and potential loss in image quality as a result of the transcoding (e.g., associated with decompression and recompression), which can be a technical problem and can result in a user experience that is jittery, laggy, and/or features low image quality (e.g., with distracting and/or disorienting image artifacts). The XR management systems and techniques disclosed herein (e.g., see FIGS. 12-14) can omit transcoding (e.g., decoding, encoding, decompressing, compressing, decrypting, and/or encrypting) of content (e.g., sensor data and/or XR content) at the XR management system (e.g., XR management system 1104), instead passing the content in its encoded and/or compressed and/or encrypted form between the XR interface device (e.g., XR interface device 1102) and the XR processing device (e.g., XR processing device 1106). Thus, the XR management systems and techniques disclosed herein can reduce or eliminate latency and/or quality loss (e.g., image quality loss), improving smoothness and image quality in the user experience. By omitting the transcoding of the content at the XR management system, the XR management systems and techniques disclosed herein can further reduce power consumption at the XR management system (e.g., by omitting transcoding), can reduce heat generation (and thus need for heat dissipation components) at the XR management system (e.g., by omitting transcoding), can reduce use of computational resources at the XR management system (e.g., by omitting transcoding), can improve security (e.g., by reducing potential points of failure by not decrypting the content at the XR management system and/or by using the XR management system to negotiate security protocols between the XR interface device and the XR processing device), can improve reliability (e.g., by reducing potential points of failure), can improve bitrate (e.g., by using the XR management system to negotiate bitrate capabilities between the XR interface device and the XR processing device and reduce need for transcoding of content for a different bitrate), or a combination thereof.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1510 discussed with respect to the computing system 1500. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1520, read-only memory (ROM) 145 and/or 1525, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1535, any other input devices 1545, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1502.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
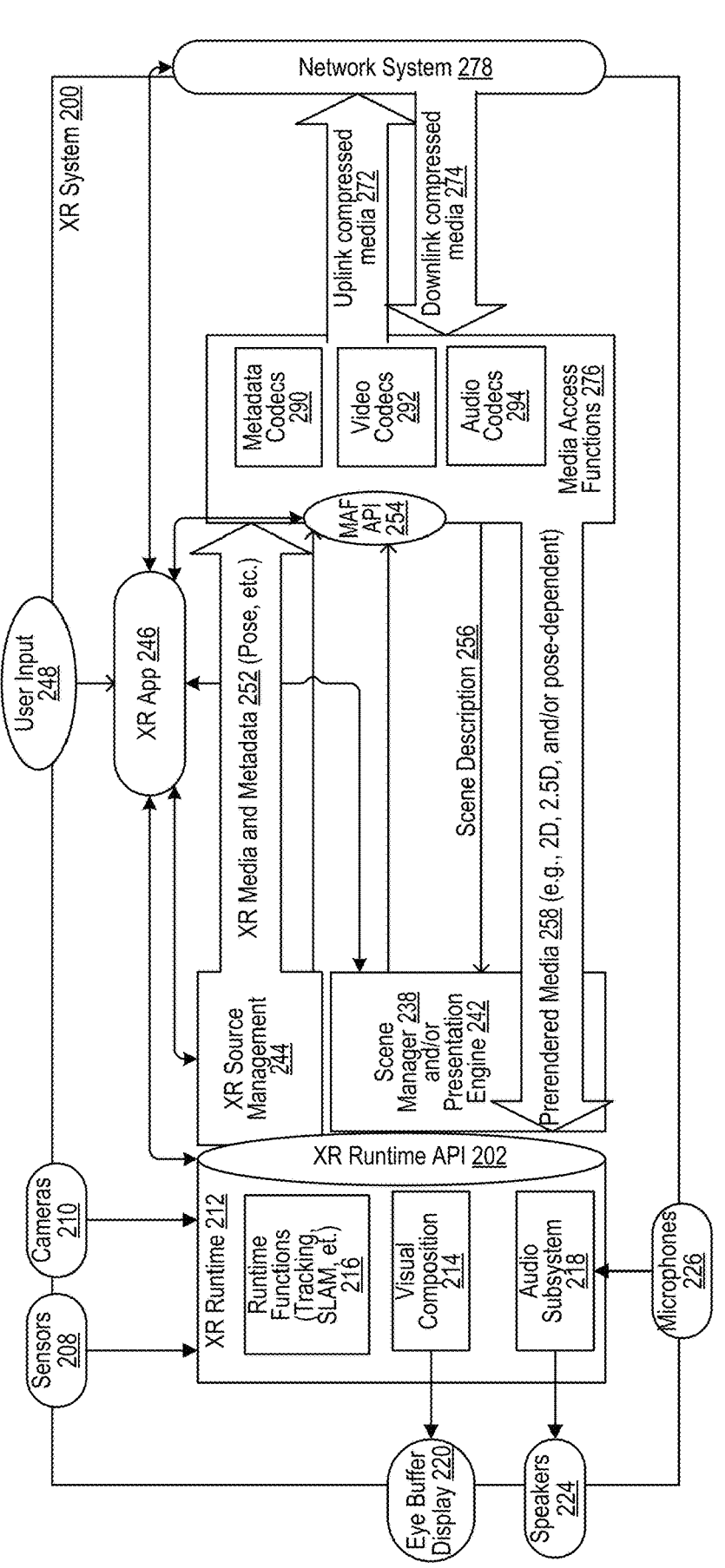
FIG. 2 is a block diagram illustrating an example architecture of an extended reality (XR) system, in accordance with some examples.

FIG. 2 is a block diagram illustrating an example architecture of an extended reality (XR) system 200. In some examples, the XR system 200 of FIG. 2 is, or includes, an XR system with a Media Capabilities for Augmented Reality (MeCAR) architecture, an EDGe-dependent Augmented Reality (EDGAR) architecture, another architecture discussed herein, or a combination thereof. For instance, in some examples, the XR system 200 can include, and/or be, an optical see-through XR device, a video pass-through XR device, or a combination thereof.

The XR system 200 includes an XR runtime subsystem 212 that interfaces with input device(s) and/or output device(s). For instance, the XR runtime subsystem 212 receives sensor data from sensor(s) 208 such as camera(s) 210, microphone(s) 226, and/or other sensor(s). The camera(s) 210 can include image sensor(s) (e.g., image sensor(s) 130) that capture image(s) and/or video(s), for instance of a scene (or environment) in front of and/or around the user of the XR system 200, of the user of the XR system 200 (e.g., of the user's eyes for eye tracking, of the user's hands for hand tracking, of the user's face for expression tracking, of the user's body for body pose tracking, or a combination thereof), or a combination thereof. Similarly, the microphone(s) 226 can capture audio of the scene (e.g., of other people or objects in the scene), of the user (e.g., the user's voice), or a combination thereof. In some examples, other sensor(s) (of the sensor(s) 208) can include accelerometer(s), gyroscope(s), gyrometer(s), inertial measurement unit(s) (IMU(s)), depth sensor(s), altimeter(s), barometer(s), positioning receiver(s), or combinations thereof. Positioning receiver(s) can include Global Navigation Satellite System (GNSS) receivers or transceivers that are used to determine a location of the XR system 200, such as the Global Positioning System (GPS), the Global Navigation Satellite System (GLONASS), the BeiDou Navigation Satellite System (BDS), the Europe-based Galileo GNSS, another GNSS, or a combination thereof. Depth sensor(s) (which can be referred to as range sensors or distance sensors) can include light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, sets of cameras that perform stereoscopic depth sensing, or combinations thereof.

The XR runtime subsystem 212 of the XR system 200 performs various runtime functions 216 such as pose tracking (e.g., of the pose of the XR system 200 and/or of the user), eye tracking (e.g., of the user's eyes), hand tracking (e.g., of the user's hands), body tracking (e.g., of the user's body), feature tracking (e.g., of features in the scene and/or the user), object tracking (e.g., of objects in the scene and/or parts of the user), face tracking (e.g., of the user's face and/or other people's faces in the scene), simultaneous localization and mapping (SLAM), or a combination thereof. Pose refers to location (e.g., longitude, latitude, altitude), orientation (e.g., pitch, yaw, roll), or a combination thereof. Pose can be tracked across 3 degrees of freedom (3DoF), 6 degrees of freedom (6DoF), or another range. The XR runtime subsystem 212 of the XR system 200 includes a visual composition subsystem 214 that couples to an eye buffer display 220, which may be a buffer for one or more display(s) (e.g., display(s) 340, display 440) directed toward the eye(s) of the user. The XR runtime subsystem 212 of the XR system 200 includes an audio subsystem 218 that receives audio from the microphone(s) 226 and/or that outputs audio to speaker(s) 224. The speaker(s) 224 can include loudspeakers, headphones, earbuds, other audio output devices, or combinations thereof.

The XR system 200 includes an XR application 246 that can receive user input(s) 248 via an input interface of the XR system 200. The input(s) 248 can be passed to an XR runtime application programming interface (API) 202, an XR source management subsystem 244, a scene manager 238 and/or presentation engine 242, a media access function (MAF) API 254, and/or a network system 278. In some examples, the XR application 246 is a video game, or is associated with a video game, with the user input(s) 248 for instance including input(s) to the video game (e.g., controller inputs) that can impact what virtual content is rendered in in the XR content to be shown to the user (e.g., via the eye buffer display 220).

The XR system 200 is configured for split rendering, and thus at least a subset of processing tasks are to be performed by an XR management system and/or an external XR processing device (e.g., edge node, remote server) that is coupled to the XR system 200 via the network system 278, and/or that is part of the network system 278 (e.g., as in an edge node). For instance, the sensor data captured by the XR system (e.g., as discussed above), the user input(s) 248, and/or associated metadata are collected by the XR system 200. The XR runtime API 202 and the XR source management subsystem 244 collects and conveys these as XR media and metadata 252 (e.g., including image(s), input(s), pose, etc.) to a media access function (MAF) subsystem 276. The MAF subsystem 276 encodes, compresses, and/or encrypts the XR media and metadata 252 (e.g., using metadata codecs 290, video codecs 292, and/or audio codecs 294) to form uplink compressed media 272 that is sent out to the external XR processing device (e.g., edge node, remote server). The XR processing device decrypts, decompresses, decodes, and/or processes the uplink compressed media 272 to generate XR content. For instance, in some examples, the XR processing device adds virtual content to generate the XR content. The XR processing device encodes, compresses, and/or encrypts the resulting XR content, which is received via the network system 278 as downlink compressed media 274. The MAF subsystem 276 decrypts, decompresses, and/or decodes the downlink compressed media 274 to extract prerendered media 258 (e.g., 2D media, 2.5D media, and/or pose-dependent media), a scene description 256, or a combination thereof.

The prerendered media 258, the scene description 256, and/or the user input(s) 248 are passed to the scene manager 238 and/or presentation engine 242 and/or the XR runtime API 202 to the XR runtime subsystem 212. The scene manager 238 and/or presentation engine 242 and/or the XR runtime API 202 determine what image(s) the visual composition subsystem 214 of the XR runtime subsystem 212 outputs to the eye buffer display 220 to be displayed to the user.

In some examples, the XR system 200 is a single device, such as a headset (e.g., head-mounted display (HMD) 310, glasses, eyewear, wearable device(s), or combinations thereof), a mobile device (e.g., mobile handset, tablet, laptop, wearable device), or a combination thereof. In some examples, the XR system 200 includes multiple devices, such as an XR interface device and an XR management system. In some examples, the XR interface device includes sensor(s) (e.g., sensors 208, cameras 210, microphones 226), display(s) (e.g., eye buffer display 220), user interface(s) (e.g., through which user input(s) 248 are received), and/or certain elements that control these. In an illustrative example, the XR interface device is a headset (e.g., head-mounted display (HMD) 310, glasses, eyewear, wearable device(s), or combinations thereof), a mobile device (e.g., mobile handset, tablet, laptop, wearable device), or a combination thereof. In some examples, XR management system can include other elements illustrated in the XR system 200 (e.g., other than the sensors and/or the display), and can interface between the XR interface device and the XR processing device. In some examples, the XR system 200 can include the XR application 246. In some examples, the XR management system is a mobile device (e.g., mobile handset, tablet, laptop, wearable device). In some examples, the XR management system is locally coupled (e.g., wirelessly or using wire(s)) to the XR interface device. In some examples, the XR processing device is a remote computing system (e.g., an edge node, a remote server) that is coupled to the XR management system over a network communication interface, such as a cellular network (e.g., 5G) interface. In some examples, the XR interface device may lack a connection to the internet, while the XR management system has a connection to the internet (e.g., via the network system 278).

In some examples, split rendering across a link may have limitations in terms of formats that can be used, as well as on the supported connectivity and associated bitrates. The knowledge of the capabilities of a tethered XR interface device, accessible through the XR Runtime API 202 on the XR management system, can support the operation of the XR management system over a network (e.g., 5G cell network) in terms of required bitrates and/or example formats.

Technical problems that can be caused in split rendering can include restricted raw formats. For instance, in some cases, formats that are usable by an XR interface device can be limited or restricted, for instance in terms of resolution, based on the capabilities of the XR interface device and/or the capabilities (e.g., bandwidth, bitrate, baud rate) of connection(s) (e.g., between the XR interface device and the XR management system, between the XR management system and the XR processing device, or both). The capabilities (e.g., bandwidth, bitrate, baud rate) of connection(s) can be restricted and in some cases can change dynamically (e.g., to reduce power usage or temperature, to allow other content to be transferred such as firmware updates, and the like). In some cases, security frameworks (e.g., encryption, decryption, etc.) between XR interface devices and XR management systems should be aligned, and issues can be caused by a misalignment.

Technical problems that can be caused in split rendering can include power usage and latency added from transcoding. For instance, in some examples, the XR interface device provides compressed data to the XR management device, the XR management device decompresses the data and then recompresses the data to send to the XR processing device, the XR processing device again decompresses the data to process the data and recompresses the data to send back to the XR management device, and the XR management device again decompresses the data to process the data and recompresses the data to send back to the XR interface device. These numerous decompressing and compressing steps can introduce visual artifacts, distortion, and/or other losses in quality, use more power, and can represent potential gaps in security during which data is uncompressed and unencrypted.

Solutions in which sensor data is compressed at the XR interface device and remains compressed through the XR management device to the XR processing device, and in which processed XR data is compressed at the XR processing device and remains compressed through the XR management device to the XR interface device, solve the technical problems discussed above. Examples of such solutions are illustrated in FIGS. 10, 12, 13, and 14.

Compression and decompression as discussed herein can refer to spatial compression (e.g., of the individual video frames of a video), temporal compression (e.g., across multiple video frames of a video), predictive motion compensation, or a combination thereof. In some examples, compression and decompression as discussed herein can refer to compression and/or decompression using video coding formats and/or video compression formats such as H.264, H.265, Versatile Video Coding (VVC), AOMedia Video 1 (AV1), differential pulse-code modulation (DPCM), discrete cosine transform (DCT), discrete wavelet transform (DWT), or a combination thereof. In some examples, the compression and/or decompression discussed herein is lossy. In some examples, the compression and/or decompression discussed herein is lossless.

In some examples, the XR system 200 can perform visual processing according to a MeCAR architecture. The XR system 200 can apply to the XR runtime API 202 and/or can be aligned with OpenXR processing. In some examples, to present images to the user, the XR runtime subsystem 212 can provides images organized in swapchains for the application to render into (e.g., images captured by the camera(s) 210 and/or as XR content provided to the eye buffer display 220). The swapchain images can be 2D images or 2D Array (e.g., 2.5D image sets). Arrays allow to extract a subset of the 2D images for rendering.

In some examples, the XR runtime subsystem 212 may support different swapchain image formats and the supported image formats may be provided to the application through an XR runtime API 202. In an illustrative example, the XR runtime subsystem 212 supports at least R8G8B8A8 and R8G8B8A8 sRGB formats. Details may depend on the graphics API specified in xrCreateSession. Options include DirectX and/or open graphics library (OpenGL). In an illustrative example, the XR system can support OpenGL for embedded systems (OpenGL ES), for instance using functionalities provided in XR_KHR_opengl_es_enable.

In some examples, the XR application 246 and/or the scene manager 238 and/or presentation engine 242 can offload the composition of the XR content (to be displayed to the user via the eye buffer display 220) to a XR runtime-supplied compositor, for instance of the XR processing device. Offloading composition of the XR content reduces rendering complexity, for instance offloading functions such as frame-rate interpolation and distortion correction from the XR interface device (e.g., the XR runtime subsystem 212) to the XR processing device.

In some examples, the XR runtime subsystem 212 (e.g., the visual composition subsystem 214) of an XR system 200 supports functionalities such as OpenXR composition, Projection composition, Quad composition, Cube composition, Cylinder composition, Equirectangular composition, or combinations thereof.

The XR system 200 of FIG. 2 can perform audio processing according to the MeCAR PD architecture. In some examples, the audio processing subsystem 218 can use OpenXR and/or Open Sound Library (OpenSL) ES. In some examples, the audio processing subsystem 218 can perform immersive audio rendering as discussed herein. In some examples, an interface to the XR runtime subsystem 212 hands over raw audio buffers to determine how the XR application 246 and scene manager 238 accesses the XR interface device's audio capabilities. For instance, OpenSL ES supports both file-based and in-memory data sources, as well as buffer queues, for efficient streaming of audio data from memory to the audio system. Buffer queues in OpenSL may be viewed as equivalent to visual swap chains. OpenSL ES may be viewed as companion to 3D graphic APIs such as OpenGL ES. The 3D graphics engine will render the 3D graphics scene to a two-dimension display device (e.g., eye buffer display 220), and the OpenSL ES implementation will render the 3D audio scene to the audio output device (e.g., the speakers 224).

In addition to the functionalities from such buffer queues, different types of audio signals may be provided, and additional or alternative processing steps may be carried out. Audio signals (i.e. the combination of metadata and buffer queues) may be: (a) non-immersive or also known as non-diegitic, i.e. they are not rendered according to the pose; (b) immersive and describe a full 6DoF experience in the reference space of the XR session, in which case, the XR runtime will create a rendered signal according to the latest pose; (c) immersive and pre-rendered for a specific render pose (in which case, the signals can be prepared such that the runtime can use the audio signal and the associated render pose and supplementary data for a pose correction to the latest pose); (d) a mixture of such signals that are jointly presented; (e) the signals may originate from different source, for example some may be generated locally, others may be part of a pre-rendering or a full scene created in the network; or (f) a combination thereof.

Figure 3A:
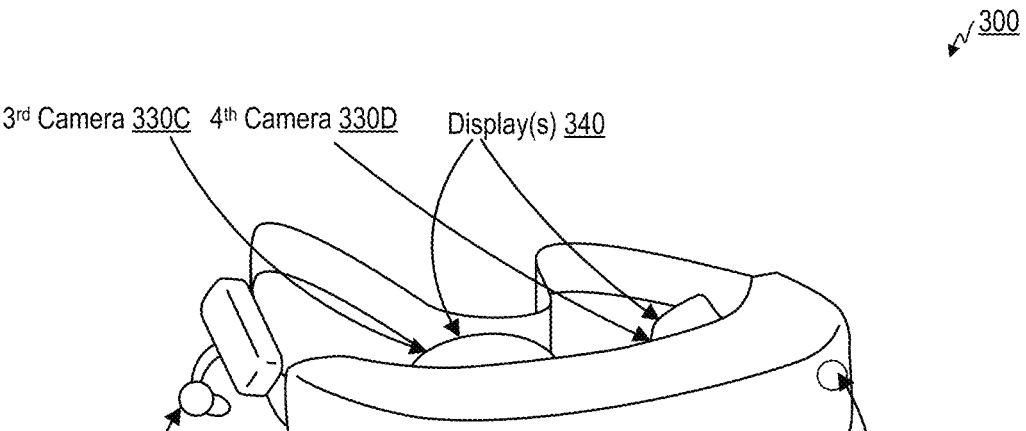
FIG. 3A is a perspective diagram illustrating a head-mounted display (HMD) that is used as part of an imaging system, in accordance with some examples.

FIG. 3A is a perspective diagram 300 illustrating a head-mounted display (HMD) 310 that is used as part of a sensor data processing system. The HMD 310 may be, for example, an augmented reality (AR) headset, a virtual reality (VR) headset, a mixed reality (MR) headset, an extended reality (XR) headset, or some combination thereof. The HMD 310 includes a first camera 330A and a second camera 330B along a front portion of the HMD 310. The HMD 310 includes a third camera 330C and a fourth camera 330D facing the eye(s) of the user as the eye(s) of the user face the display(s) 340. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

Figure 3B:
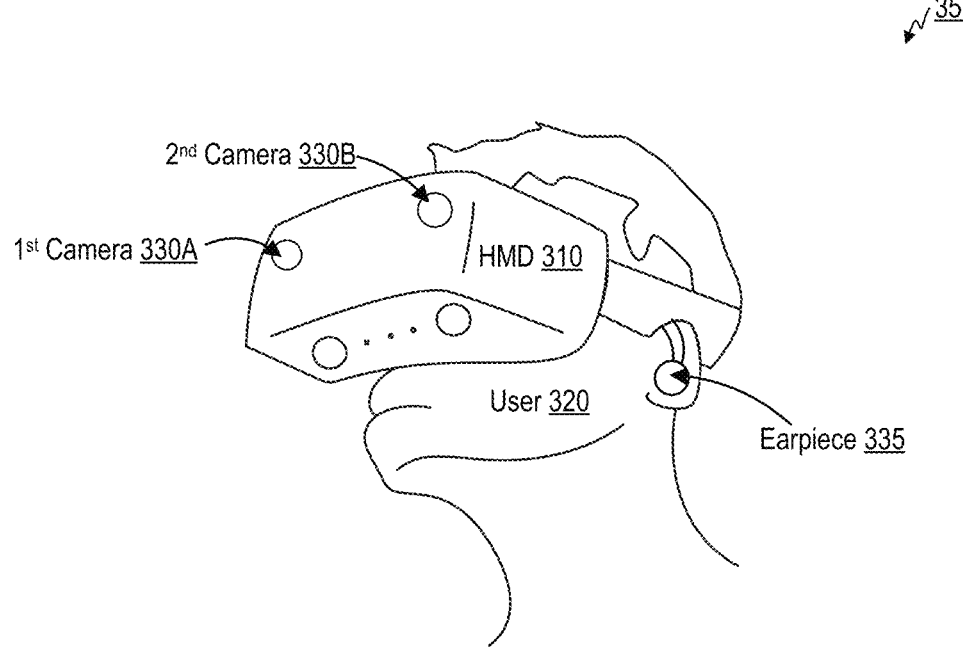
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include virtual content and/or processed content discussed herein. The output images can be based on the images captured by the first camera 330A and the second camera 330B (e.g., the image(s) and/or other sensor data), for example with the processed content (e.g., virtual content and/or processed content discussed herein) overlaid. The output images may provide a stereoscopic view of the environment, in some cases with the processed content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid processed content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the processed content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
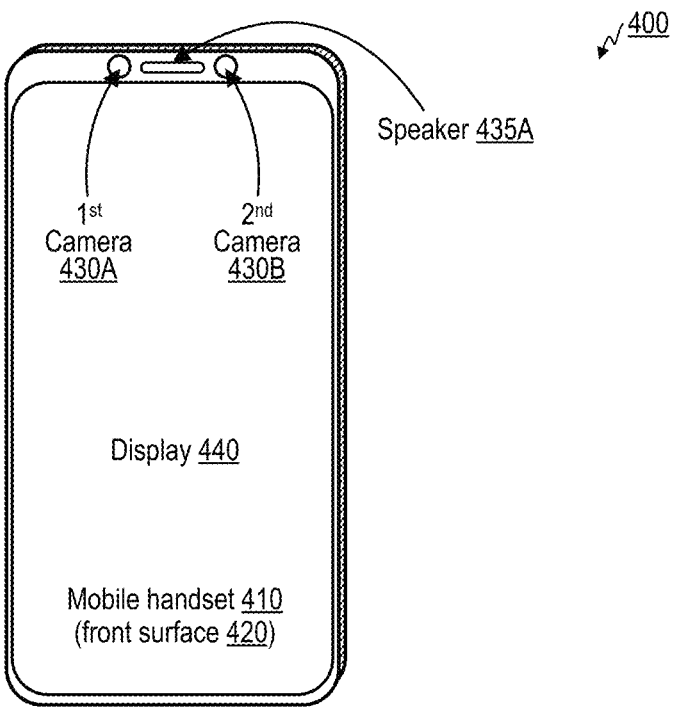
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of a sensor data processing system. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B can face the user, including the eye(s) of the user, while content (e.g., virtual content and/or processed content discussed herein) is displayed on the display 440.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include virtual content and/or processed content discussed herein. The output images can be based on the images (e.g., the image(s) and/or other sensor data) captured by the first camera 430A, the second camera 430B, the third camera 430C, and/or the fourth camera 430D, for example with the processed content (e.g., virtual content and/or processed content discussed herein) overlaid.

In some examples, the front surface 420 of the mobile handset 410 may include one or more additional cameras in addition to the first camera 430A and the second camera 430B. In some examples, the front surface 420 of the mobile handset 410 may include one or more additional sensors in addition to the first camera 430A and the second camera 430B. In some cases, the front surface 420 of the mobile handset 410 includes more than one display 440. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the front surface 420 of the mobile handset 410. In some examples, the audio output by the mobile handset 410 to the user through the one or more speakers 435A and/or other audio output devices may include, or be based on, audio recorded using the one or more microphones.

Figure 4B:
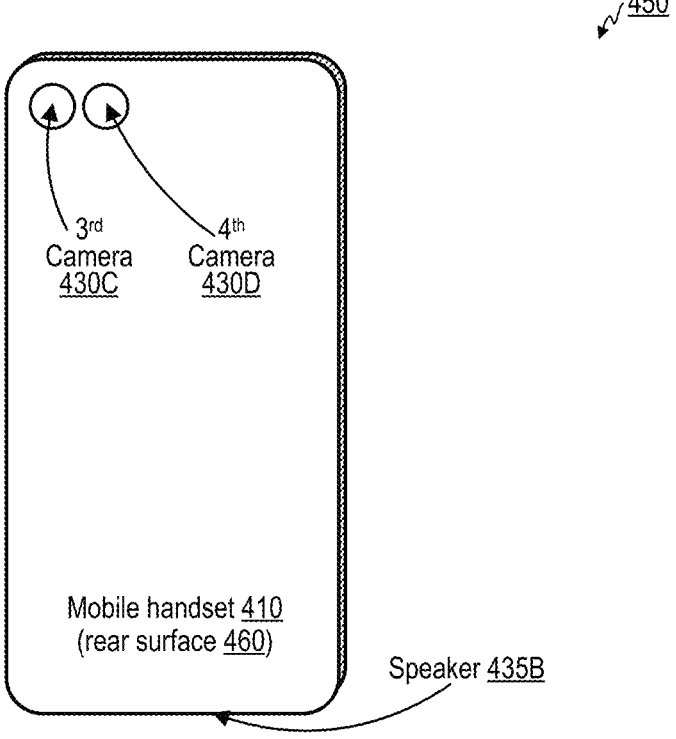
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of a sensor data processing system. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. In some examples, the rear surface 460 of the mobile handset 410 may include one or more additional sensors in addition to the third camera 430C and the fourth camera 430D. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the rear surface 460 of the mobile handset 410. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as virtual content and/or processed content discussed herein. The output images can be based on the images (e.g. the image(s) and/or other sensor data) captured by the third camera 430C and/or the fourth camera 430D, for example with the processed content (e.g., virtual content and/or processed content discussed herein) overlaid. The first camera 430A and/or the second camera 430B can capture images of the user's eyes (and/or other portions of the user) before, during, and/or after the display of the output images with the processed content on the display 440. This way, the sensor data from the first camera 430A and/or the second camera 430B can capture reactions to the processed content by the user's eyes (and/or other portions of the user).

Figure 5:
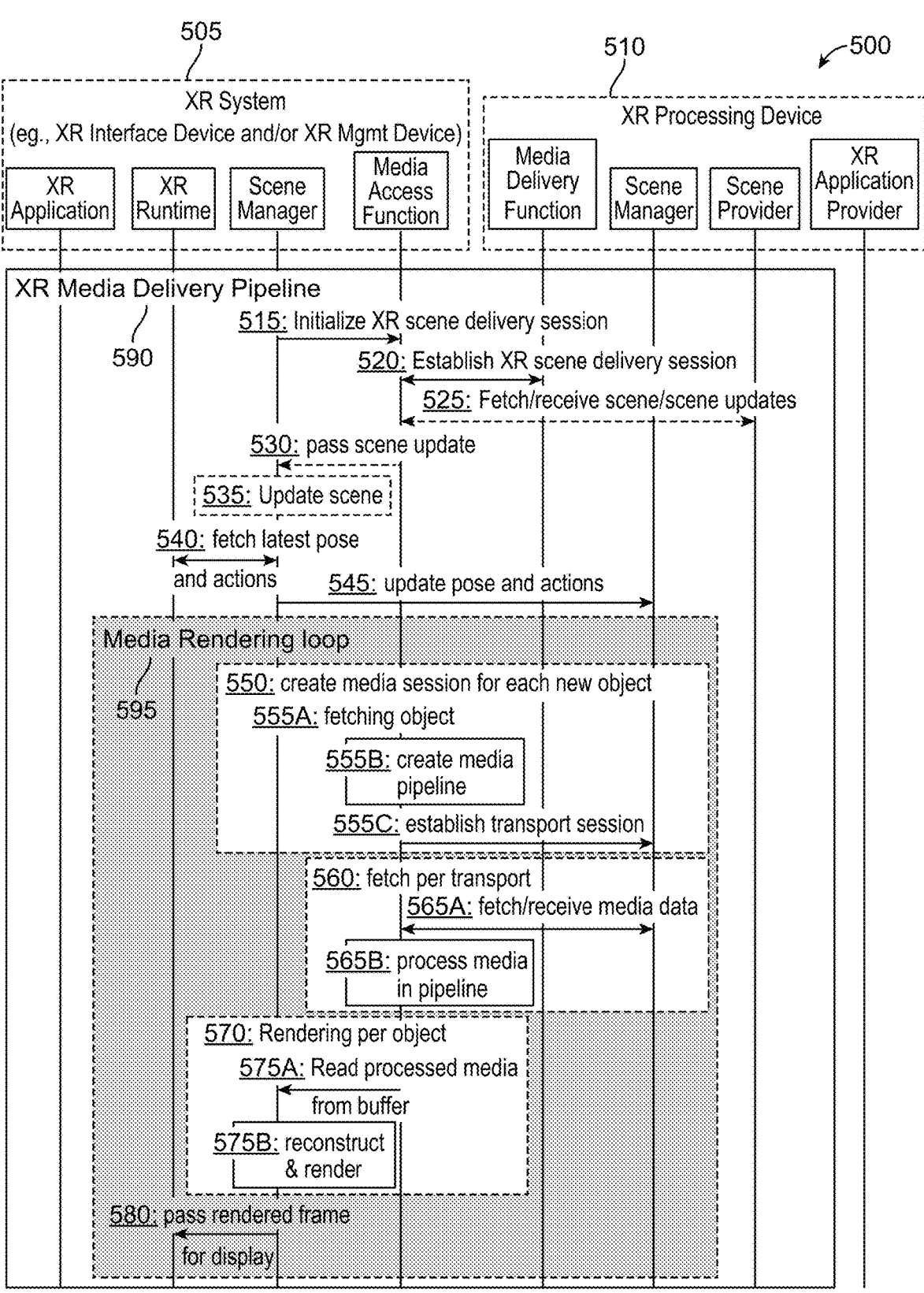
FIG. 5 is a swim lane diagram illustrating a workflow for local processing, in accordance with some examples.

FIG. 5 is a swim lane diagram illustrating a process 500 for XR processing. The process 500 is divided among an XR system 505 (e.g., that includes an XR interface device and/or an XR management system) and an XR processing device (e.g., edge node and/or remote server). The XR system 505 can include an XR application, an XR runtime, a scene manager, and a media access function subsystem. The XR processing device 510 includes a media delivery function, a scene manager, a scene provide, and in some examples an XR application provider.

The illustrated process 500 represents a media delivery pipeline 590 for extended reality (XR). The process 500 includes an operation 515 in which the Scene Manager initializes an XR delivery session. The process 500 includes an operation 520 in which the media access function (MAF) establishes the XR delivery session with the media delivery function. The process 500 includes an operation 525 in which the MAF may receive updates to the scene description from the scene provider. The process 500 includes an operation 530 in which the MAF passes the scene update to the Scene Manager of the XR system 505. The process 500 includes an operation 535 in which the Scene Manager of the XR system 505 updates the scene. The process 500 includes an operation 540 in which the Scene Manager of the XR system 505 acquires the latest pose information and the user's actions. The process 500 includes and an operation 545 in which the Scene Manager of the XR system 505 that information with the Scene Manager in XR processing device 510.

A media rendering loop 595 of the media delivery pipeline 590 includes operations 550, 555A-555C, 560, 565A-565B, 570, 575A-575B, and 580, including three loops. At operation 550, a session is created for each new object in the scene. For each new object in the scene: at operation 555A, the Scene Manager of the XR system 505 triggers the MAF to fetch the related media; at operation 555B, the MAF creates a dedicated media pipeline to process the input; and at operation 555C, the MAF establishes a transport session for each component of the media object. At operation 560, transports sessions are processed. For each transport session: at operation 565A, the media pipeline fetches the media data (e.g., the media data can be static, segmented, and/or real-time media streams); and at operation 565B, the media pipeline processes the media and makes the processed media available in buffers. At operation 570, rendering is performed. For each object to be rendered: at operation 575A, the Scene Manager of the XR system 505 gets processed media data from the media pipeline buffers; and, at operation 575B, the Scene Manager of the XR system 505 reconstructs and renders the object. At operation 580, the Scene Manager of the XR system 505 passes the rendered frame to the XR Runtime for display on the XR interface device (e.g., the user's headset, HMD 310, eyewear, wearable device, or mobile handset 410).

In some examples, an additional operation can be added before operation 515. At this additional operation, the capabilities of the XR Runtime can be queried. In some examples, operation 580 can be adjusted so that the render frame format is more detailed (e.g., the render frame format is a swap chain format). In the systems and methods described herein, the flow in the process 500 can apply to XR processing, for instance in a MeCAR architecture.

Figure 6:
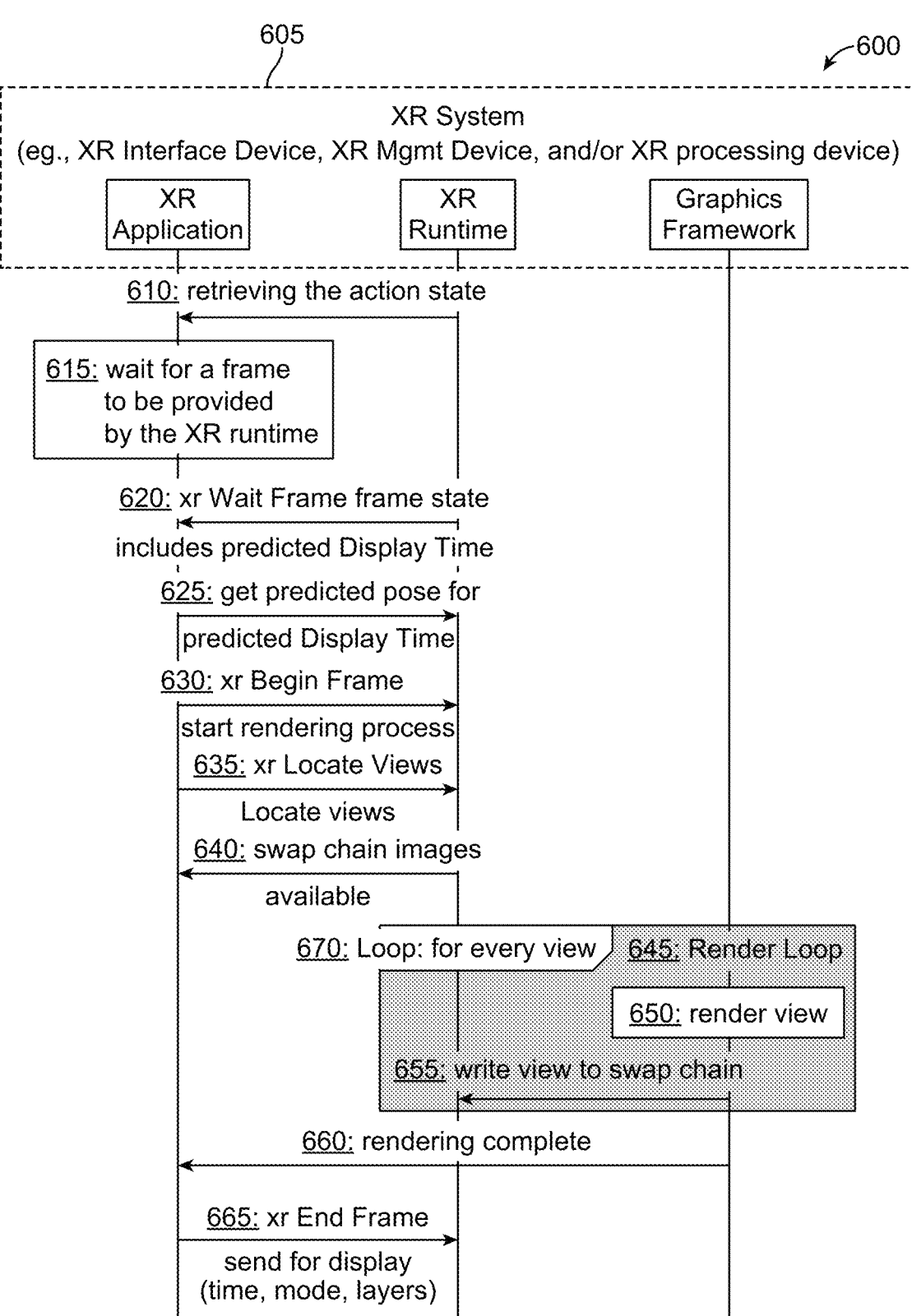
FIG. 6 is a swim lane diagram illustrating an extended reality (XR) application life cycle, in accordance with some examples.

FIG. 6 is a swim lane diagram illustrating an extended reality (XR) application life cycle 600. In an illustrative example, the XR application life cycle 600 of FIG. 6 can represent an OpenXR application life cycle. In some examples, certain actions in the XR application life cycle 600 are synchronized with one another, and/or relative to one another. The operations of the XR application life cycle 600 are performed by an XR system 605, which can include an XR interface device, an XR management system, an XR processing device, or a combination thereof.

At operation 610, the XR application retrieves the action state of the XR runtime. At operation 615, the XR application waits for a frame to be provided by the XR runtime. At operation 620, an xrWaitFrame frame state (of frame(s) from the XR runtime) includes predictedDisplayTime. At operation 625, the XR application and/or XR runtime gets a predicted pose corresponding to the predictedDisplayTime. At operation 630, the XR application starts the rendering process for the XR runtime via xrBeginFrame. At operation 635, the XR application and/or the XR runtime locates views via xrLocateViews. At operation 640, swap chain images are available to the XR application (e.g., from the XR runtime).

The XR application life cycle 600 includes a render loop 670. For every view: at operation 645, the graphics framework starts the render loop; at operation 650, the graphics framework renders a view (operation 650), respectively; and at operation 655, the graphics framework writes the view to swap chain associated with the XR runtime.

Once the render loop 670 is complete, at operation 660, the graphics framework indicates to the XR application that rendering is complete. At operation 665, the XR application sends information (e.g., time, mode, and/or layers) for display via xrEndFrame.

In some examples, the XR application life cycle 600 of FIG. 6 can represent an OpenXR application life cycle. In an illustrative example, after creating an OpenXR session, the application starts a frame loop. The frame loop is executed for every frame. The frame loop consists of the following operations. A first frame loop operation synchronizes actions, for instance including retrieving the action state (e.g. the status of user input controller buttons, the pose of the XR interface device, and/or location(s) of different trackable object(s)) and/or sending haptic feedback. A second frame loop operation starts a new frame, for instance starting with waiting for a frame to be provided by the XR runtime as appropriate to synchronize the application frame submission with the display. In some examples, the xrWaitFrame function returns a frame state for the requested frame that includes a predictedDisplayTime, which is a prediction of when the corresponding composited frame will be displayed. This information is used by the application to request the predicted pose at display. Once the xrWaitFrame function completes, the application calls xrBeginFrame to signal the start of the rendering process. A third frame loop operation retrieves rendering resources. For instance, the application starts by locating the views in space and time by calling the xrLocateViews function, provided with the predicted display time and the XR space. The application acquires the swap chain image associated with every view of the composition layer, and waits for the swap chain image to be made available so the application can write into it. A fourth frame loop operation concerns rendering. The application performs its rendering work, for instance by iterating over the scene graph nodes and rendering each object to the view. In some examples, rendering uses a graphics framework such Vulkan, OpenGL, and/or Direct3D to perform graphics operations. A fifth frame loop operation concerns releasing resources. Once the rendering is done for a view, the application releases the corresponding swap chain image. Once all views are rendered, the application sends the views for display (e.g., at the display(s) of the XR interface device) by calling the xrEndFrame function.

For audio media, similar processes as video typically apply. In some examples, OpenXR and/or Open Sound Library (OpenSL) ES are used for audio and/or video processing. In some examples, immersive audio rendering can include operations as discussed herein. An interface to the XR runtime is available to hand over raw audio buffers to determine how the XR application and scene manager would access a device's audio capabilities. In an illustrative example, some systems (e.g., OpenSL ES) support file-based data sources, in-memory data sources, and/or buffer queues, for efficient streaming of audio data from memory to the audio system. Buffer queues in OpenSL may be viewed as equivalent to visual swap chains. OpenSL ES may be viewed as companion to 3D graphic APIs such as OpenGL ES. The 3D graphics engine will render the 3D graphics scene to a two-dimension display device, and the OpenSL ES implementation will render the 3D audio scene to the audio output device. In today's implementations, in addition to the functionalities from such buffer queues, different types of audio signals may be provided, and additional/alternative processing steps may be carried out. Audio signals (i.e. combination of metadata and buffer queues) may be: (a) non-immersive and/or non-diegitic (e.g., not rendered according to the pose); (b) Immersive and describe a full 6DoF experience in the reference space of the XR session (e.g., with the XR runtime creating a rendered signal according to the latest pose); (c) immersive and/or pre-rendered for a specific render pose (e.g., with the signals being prepared such that the XR runtime can use the audio signal and/or the associated render pose and/or supplementary data for a pose correction to the latest pose), (d) a mixture of such signals that are jointly presented, (e) signals that originate from different source(s) (e.g., some signals may be generated locally, others may be part of a pre-rendering or a full scene created in the network), or (f) a combination thereof. In some examples, the audio data compressed or uncompressed.

Figure 7:
FIG. 7 is a block diagram illustrating an example architecture of an extended reality (XR) system including an extended reality (XR) interface device and an XR management system, in accordance with some examples.

FIG. 7 is a block diagram illustrating an example architecture of an extended reality (XR) system 700 including an extended reality (XR) interface device 702 and an XR management system 704. The XR system 700 can be an example of the XR system 200. In an illustrative example, the XR interface device 702 is a headset (e.g., head-mounted display (HMD) 310, glasses, eyewear, wearable device(s), or combinations thereof), a mobile device (e.g., mobile handset 410, tablet, laptop, wearable device), or a combination thereof. The XR management system 704 couples to the XR interface device 702, and in some cases can couple to a XR processing device through a cellular network subsystem 776. In some examples, the XR management system 704 is a mobile device (e.g., mobile handset 410, tablet, laptop, wearable device). In some examples, the XR management system 704 is locally coupled (e.g., wirelessly or using wire(s)) to the XR interface device 702. In some examples, the XR processing device is a remote computing system (e.g., an edge node, a remote server) that is coupled to the XR management system over a network communication interface, such as a cellular network (e.g., 5G) interface. In some examples, the XR interface device may lack a connection to the internet, while the XR management system has a connection to the internet (e.g., via the network system 278).

The XR interface device 702 of the XR system 700 includes an XR runtime subsystem 712 that interfaces with input device(s) and/or output device(s). For instance, the XR runtime subsystem 712 receives sensor data from sensor(s) 708 such as camera(s) 710, microphone(s) 726, and/or other sensor(s). The camera(s) 710 can include image sensor(s) (e.g., image sensor(s) 130) that capture image(s) and/or video(s), for instance of a scene (or environment) in front of and/or around the user of the XR system 700, of the user of the XR system 700 (e.g., of the user's eyes for eye tracking, of the user's hands for hand tracking, of the user's face for expression tracking, of the user's body for body pose tracking, or a combination thereof), or a combination thereof. Similarly, the microphone(s) 726 can capture audio of the scene, of the user, or a combination thereof. In some examples, other sensor(s) (of the sensor(s) 708) can include any of the sensors discussed with respect to the sensor(s) 208.

The XR runtime subsystem 712 of the XR system 700 performs various runtime functions such as pose tracking (e.g., of the pose of the XR system 700 and/or of the user), eye tracking (e.g., of the user's eyes), hand tracking (e.g., of the user's hands), body tracking (e.g., of the user's body), feature tracking (e.g., of features in the scene and/or the user), object tracking (e.g., of objects in the scene and/or parts of the user), face tracking (e.g., of the user's face and/or other people's faces in the scene), SLAM, or a combination thereof.

The XR interface device 702 is coupled to the XR management system 704 through a tethering communication interface 732, which can also be referred to as a connection, a tether, a link, a coupling, or an interface. The tethering communication interface 732 can be a local coupling or local interface, for instance referring to a wired coupling or connection, a short-range wireless coupling or connection, or a combination thereof. On one end of the tethering communication interface 732 is a communication interface 730 of the XR interface device 702, which is managed using XR link functions 728 of the XR interface device 702. On the other end of the tethering communication interface 732 is a communication interface 734 of the XR management system 704, which is managed using XR link functions 736 of the XR management system 704. In some examples, the tethering communication interface 732 that couples the XR interface device 702 and the XR management system 704 is a wireless communication interface, in which case the communication interface 730 of the XR interface device 702 and the communication interface 734 of the XR management system 704 can include wireless communication interfaces, such as wireless communication transceiver(s), and/or wireless communication antenna(e). If the tethering communication interface 732 is a wireless communication interface, the tethering communication interface 732 and associated components can use wireless technologies such as Wi-Fi, Bluetooth®, wireless local area network(s) (WLAN(s)), personal area network(s) (PAN(s)), cellular network connections, other wireless technologies discussed herein, or combinations thereof. In some examples, the tethering communication interface 732 can use Real-time Transport Protocol (RTP), Secure Real-time Transport Protocol (SRTP), another transfer protocol, or a combination thereof.

In some examples, the tethering communication interface 732 that couples the XR interface device 702 and the XR management system 704 is a wired communication interface, in which case the communication interface 730 and the communication interface 734 can include ports, plugs, jacks, wire connectors, or combinations thereof. If the tethering communication interface 732 is a wired communication interface, the tethering communication interface 732 and associated components can use wired technologies such as universal serial bus (USB), Apple® Lightning®, Thunderbolt®, Ethernet connectors, serial connectors, I/O connectors, local area network(s) (LAN(s)), other wired connection technologies discussed herein, or combinations thereof. In some examples, the XR link functions 728 and the XR link functions 736 can manage encoding, decoding, security (e.g., encryption and/or decryption), compression, decompression, wireless protocol management, transmission error correction, or combinations thereof.

The XR management system 704 includes an XR application 746 that can receive user input(s) 748 via an input interface (e.g., touchscreen, trackpad, button(s), controller(s), keypad(s), knobs, switches, or combinations thereof), of the XR system 700 (e.g., of the XR management system 704, an input device coupled to the XR management system 704, of the XR interface device 702, an input device coupled to the XR interface device 702, or a combination thereof). The input(s) 748 can be passed to an XR runtime application programming interface (API) 740, an XR scene API 750, an XR scene manager 742, a media access function (MAF) API 754, a MAF subsystem 760, and/or a cellular network subsystem 776 that can couple to a cellular network. In some examples, the XR application 746 is a video game. In some examples, the XR runtime API 740 may be an OpenXR application programming interface (API).

The XR system 700 is configured for split rendering, and thus at least a subset of processing tasks are to be performed by the XR management system 704 and/or an external XR processing device (e.g., edge node, remote server) that is coupled to the XR system 700 via the cellular network subsystem 776 of the XR management system 704, and/or that is part of the cellular network subsystem 776 (e.g., an edge node). For instance, the sensor data captured by the XR interface device 702 (e.g., as discussed above) and/or associated metadata is sent from the XR interface device 702 to the XR management system 704, for instance using the XR runtime API 740. The XR runtime API 740 also receives the user input(s) 748 and/or associated metadata. These inputs to the XR runtime API 740 are collected and/or combined and sent as media and/or sensor data 752 to the media access functions subsystem 760 of the XR management system 704. The media access functions subsystem 760 encodes, compresses, and/or encrypts the media and/or sensor data 752 to generate uplink media 772 that is sent to the external XR processing device through the cellular network subsystem 776 for further processing. The XR processing device decrypts, decompresses, decodes, and/or processes the uplink media 772 to generate XR content. For instance, in some examples, the XR processing device adds virtual content to generate the XR content. The XR processing device encodes, compresses, and/or encrypts the resulting XR content, which is received via the cellular network subsystem 776 as downlink compressed media 774. The MAF subsystem 760 decrypts, decompresses, and/or decodes the downlink compressed media 774 to extract primitives buffers 758 (e.g., XR content), a scene description 756, or a combination thereof.

The primitives buffers 758, the scene description 756, and/or the user input(s) 748 are passed to the XR scene manager 742, the XR scene API 750, and/or the XR runtime API 740 to the XR runtime subsystem 712. The XR scene API 750, the XR scene manager 742, the XR runtime API 740, and/or the XR runtime subsystem 712 determine what image(s) the visual composition subsystem 714 of the XR runtime subsystem 712 outputs to the eye buffer display 720 to be displayed to the user.

In some examples, split rendering across a link may have limitations and/or technical problems, such as restricted formats, restricted bandwidth, protocol misalignment, security misalignment, transcoding latency, transcoding power usage, and other issues discussed herein. Some of these technical problems can relate to insufficient communication between the XR interface device 702, the XR management system 704, and/or the XR processing device, which can be solved via communication of important contextual information about the XR interface device 702 (and/or the tethering communication interface 732) from the XR management system 704 to the XR processing device (e.g., as processing instructions) as discussed herein (e.g., as in FIGS. 12, 13, and/or 14). Some of these technical problems can relate to transcoding, for instance at the XR management system 704, which can be solved by avoiding or minimizing transcoding as discussed herein (e.g., as in FIGS. 10, 12, 13, and/or 14).

Figure 8:
FIG. 8 is a block diagram illustrating a split rendering process in the context of the architecture of the extended reality (XR) system of FIG. 7, in accordance with some examples.

FIG. 8 is a block diagram illustrating a split rendering process 800 in the context of the architecture of the extended reality (XR) system 700 of FIG. 7. In the split rendering process 800, the XR runtime includes and/or performs a split rendering operation 810, and the XR runtime subsystem 712 communicates via the XR runtime API 740 in raw formats 820 with the XR scene manager and/or the XR application. Raw formats 820 can refer to formats that are not compressed, encoded, and/or encrypted. In some examples, the sensor data from the XR interface device 702 can be sent (e.g., over the tethering communication interface 732) using the raw formats 820 to the XR management system 704. In some examples, the processed XR content that is generated at the XR processing device and/or the XR management system 704 can be sent (e.g., over the tethering communication interface 732) from the XR management system 704 to the XR interface device 702 using the raw formats 820.

In the split rendering process 800, swap chain images are provided by the XR scene manager 742 of the XR management system 704 to the XR interface device 702. In some examples, actions and/or pose information are provided to the XR application 746 via the user input 748, sensor data from the XR interface device 702, and/or other inputs to the XR application 746 (e.g., from other subsystems of the XR management system 704).

FIG. 9 is a block diagram illustrating a split rendering process 900, including encoding and decoding, in the context of the architecture of the extended reality (XR) system 700 of FIG. 7. The split rendering process 900 is an example of the split rendering process 800, with further detail illustrated around the tethering communication interface 732. In the split rendering process 900, the XR interface device 702 and the XR management system 704 each encode (and/or compress and/or encrypt) data before sending data and decode (and/or decompress and/or decrypt) data that is received, so that raw formats 820 can be used on either end (e.g., before encoding and/or compression and/or encryption, as well as after decoding and/or decompression and/or decryption).

For instance, going from the XR interface device 702 to the XR management system 704, an actions and/or pose encoder 905 of the XR interface device 702 encodes, compresses, and/or encrypts action and/or pose data (e.g., in some cases including or based on sensor data such as images and/or audio) from the XR interface device 702, for instance based on a bitrate 925, protocol 930, and/or security 935 associated with the tethering communication interface 732. The XR management system 704 receives this encoded and/or compressed and/or encrypted data and uses an actions and/or pose decoder 940 to decrypt, decode, and/or decompress the data.

Going from the XR management system 704 to the XR interface device 702, the XR management system 704 processes the XR content that it and/or the XR processing device generated and uses an encoder 945 to encode, compress, and/or encrypt the XR content to match the bitrate 925, protocol 930, and/or security 935 associated with the tethering communication interface 732. The XR interface device 702 includes a decoder 910 that decrypts, decodes, and/or decompresses the XR content. The formats 950 on the XR management system 704 and the projection formats 915 used with the eye buffer display 720 of the XR interface device 702 may not align by default in some cases, which may cause issues and/or may cause the XR management system 704 and/or the XR interface device 702 to have to modify the XR content to get from the formats 950 to the projection formats 915. In some examples, the XR management system 704 and the XR interface device 702 communicate before transferring the XR content (or any other data) to ensure that the security 955 (e.g., encryption scheme) that the XR management system 704 uses, the security 920 (e.g., encryption scheme) that the XR interface device 702 uses, and the security 935 (e.g., encryption scheme) that the tethering communication interface 732 uses or is capable of using align.

Ultimately, the encoding, compressing, encrypting, decoding, decompressing, and/or decrypting operations at both the XR interface device 702 and the XR management system 704 under the split rendering process 900 are numerous, and can cause increases in latency, power usage, battery drain, heat generation, and usage of computational resources at both the XR interface device 702 and the XR management system 704.

FIG. 10 is a block diagram illustrating a process 1000 for using passed-through encoded formats 1015 for remote rendering in the context of the architecture of the extended reality (XR) system of FIG. 7. Under the process 1000, the XR management system 704 receives the XR content from the XR processing device through the cellular network subsystem 776 in a format that is already encoded, compressed, and/or encrypted. Thus, the XR management system 704 can pass this XR content through the XR management system 704 and to the XR interface device 702 without decoding, decompressing, and/or decrypting the XR content after receipt of the XR content at the XR management system 704, as well as without encoding, compressing, and/or encrypting the XR content again before transmission of the XR content from the XR management system 704 to the XR interface device 702. Thus, the XR content maintains its encoded (and/or compressed and/or encrypted) format through the XR management system 704, hence the XR content being in passed-through encoded formats 1015 under the process 1000. The raw formats 820 of the split rendering process 800 and the split rendering process 900 are replaced with encoded formats 1020 (e.g., compressed and/or encrypted). Rather than having to use the numerous encoders and decoders on both ends of the tethering communication interface 732 under the split rendering process 900, the process 1000 instead has the XR interface device 702 receive the passed-through encoded formats 1015 and decode, decompress, and/or decrypt the XR content encoded therein using a decoder 1025. The projection format 1030 and the security 1035 (e.g., encryption scheme) are left as the main priorities in terms of format and security, with format and security, with the any formats or security schemes on the XR management system 704 being deprioritized and no longer needing alignment with the projection format 1030 and the security 1035 of the XR interface device 702. In some examples, under the process 1000, the XR runtime subsystem 712 communicates via the XR runtime API 740, the XR scene manager 742, and/or the XR application 746 in compressed formats (e.g., in the passed-through encoded formats 1015 and/or the encoded formats 1020).

Compared to the split rendering process 900, the process 1000 involves fewer operations (e.g., fewer rounds of encoding and/or decoding), reduced complexity (e.g., fewer potential points of failure), and can result in reduced latency, power usage, battery drain, heat generation, and usage of computational resources at both the XR interface device 702 and the XR management system 704.

Figure 11:
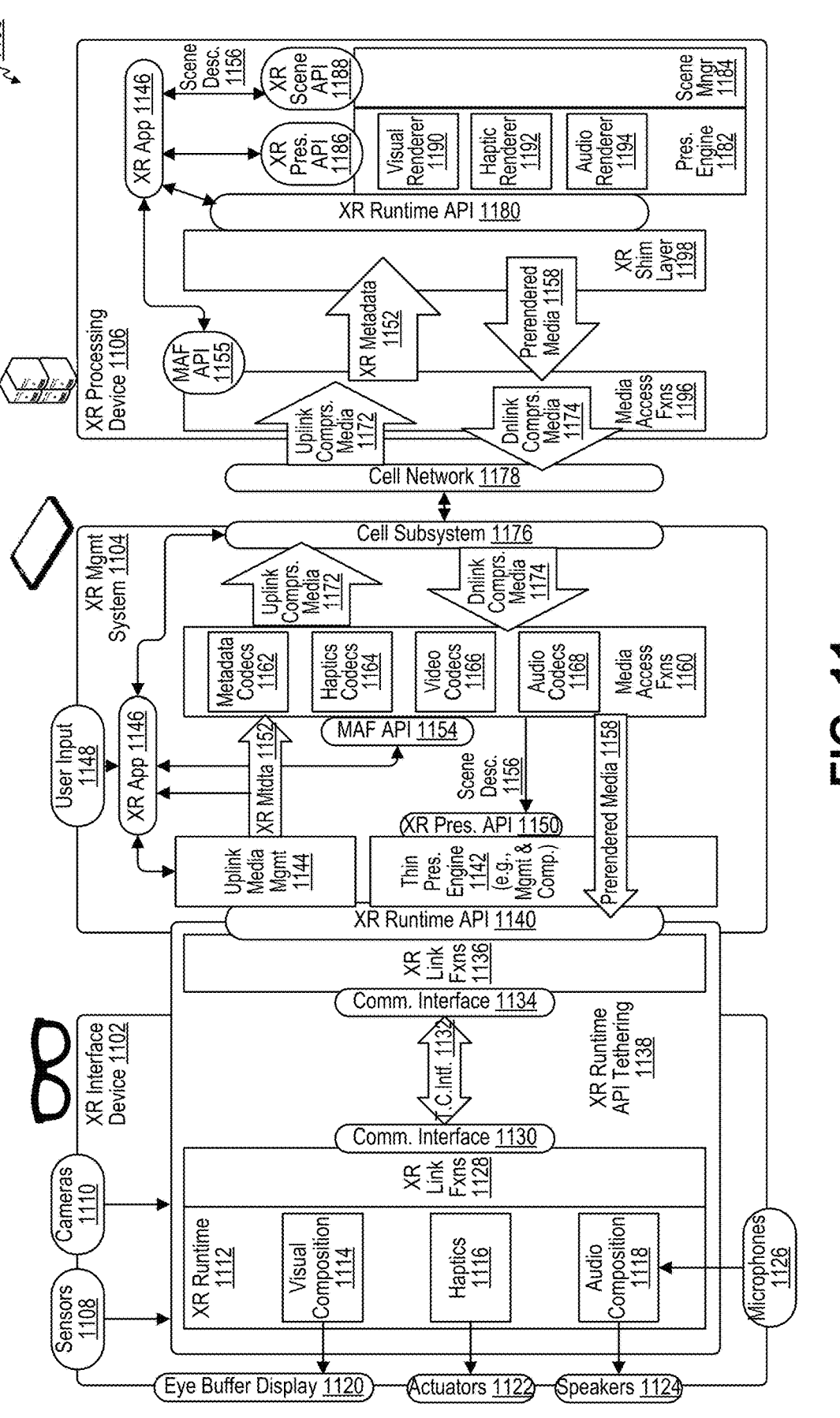
FIG. 11 is a block diagram illustrating an example architecture of an extended reality (XR) system across an extended reality (XR) interface device 702, an XR management system, and an XR processing device, in accordance with some examples.

FIG. 11 is a block diagram illustrating an example architecture of an extended reality (XR) system 1100 across an extended reality (XR) interface device 1102, an XR management system 1104, and an XR processing device 1106. In an illustrative example, the XR interface device 1102 is a headset (e.g., head-mounted display (HMD) 310, glasses, eyewear, wearable device(s), or combinations thereof), a mobile device (e.g., mobile handset 410, tablet, laptop, wearable device), or a combination thereof. The XR management system 1104 couples to the XR interface device 1102, and in some cases can couple to a XR processing device through a cellular network subsystem 1176. In some examples, the XR management system 1104 is a mobile device (e.g., mobile handset, tablet, laptop, wearable device). In some examples, the XR management system 1104 is locally coupled (e.g., wirelessly or using wire(s)) to the XR interface device 1102. In some examples, the XR processing device 1106 is a remote computing system (e.g., an edge node, a remote server) that is coupled to the XR management system over a network communication interface, such as a cellular network (e.g., 5G) interface. In some examples, the XR interface device may lack a connection to the internet, while the XR management system has a connection to the internet (e.g., via the network system 278).

In the XR system 1100 of FIG. 11, the XR processing device 1106 includes media access functions subsystem 1196, an instance (or back-end) of the XR application 1146, a scene manager 1184, a presentation engine 1182, and an XR shim layer 1198. The XR management system 1104 communicates with the XR processing device 1106 via the cell subsystem 1176 and/or the cell network 1178. The XR management system 1104 includes media access functions subsystem 1160, an uplink media management subsystem

1144, an XR application that receives a user input 1148 (e.g., via an input interface), a thin presentation engine 1142, the XR runtime API 1140, and/or a cell subsystem 1176 (e.g., 5G). The phone and the AR glasses device are coupled via the XR runtime tethering communication interface 1132. The architecture of the XR system 1100 illustrated in the block diagram of FIG. 11 may be referred to as a SmarTAR architecture.

The XR interface device 1102 of the XR system 1100 includes an XR runtime subsystem 1112 that interfaces with input device(s) and/or output device(s). For instance, the XR runtime subsystem 1112 receives sensor data from sensor(s) 1108 such as camera(s) 1110, microphone(s) 1126, and/or other sensor(s). The camera(s) 1110 can include image sensor(s) (e.g., image sensor(s) 130) that capture image(s) and/or video(s), for instance of a scene (or environment) in front of and/or around the user of the XR system 1100, of the user of the XR system 1100, or a combination thereof. Similarly, the microphone(s) 1126 can capture audio of the scene, of the user, or a combination thereof. In some examples, other sensor(s) (of the sensor(s) 1108) can include any of the sensors discussed with respect to the sensor(s) 208. In some examples, the XR runtime subsystem 1112 includes a visual composition subsystem 1114 controlling output of visual XR content to the eye buffer display 1120, a haptics subsystem 1115 controlling output of haptic feedback XR content to one or more haptic actuators 1122, and/or an audio composition subsystem 1116 controlling receipt of audio from the microphone(s) 1126 and/or output of audio XR content through the speaker(s) 1124.

In some examples, XR runtime subsystem 1112 of the XR system 1100 performs various runtime functions as discussed with respect to the XR runtime subsystem 212 and/or the XR runtime subsystem 712, such as pose tracking, eye tracking, hand tracking, body tracking, feature tracking, object tracking, face tracking, SLAM, or a combination thereof.

The XR interface device 1102 is coupled to the XR management system 1104 through a tethering communication interface 1132, similarly to the coupling of the XR interface device 702 to the XR management system 704 through the tethering communication interface 732. The tethering communication interface 1132 can be a local coupling or local interface, for instance referring to a wired coupling or connection, a short-range wireless coupling or connection, or a combination thereof. On one end of the tethering communication interface 1132 is a communication interface 1130 of the XR interface device 1102, which is managed using XR link functions 1128 of the XR interface device 1102. On the other end of the tethering communication interface 1132 is a communication interface 1134 of the XR management system 1104, which is managed using XR link functions 1136 of the XR management system 1104. The tethering communication interface 1132 can include a wireless communication interface, a wired communication interface, or a combination thereof, for instance as discussed with respect to the tethering communication interface 732 and the associated components and examples.

The XR management system 1104 includes an XR application 1146 that can receive user input(s) 1148 via an input interface (e.g., touchscreen, trackpad, button(s), controller(s), keypad(s), knobs, switches, or combinations thereof), of the XR system 1100 (e.g., of the XR management system 1104, an input device coupled to the XR management system 1104, of the XR interface device 1102, an input device coupled to the XR interface device 1102, or a combination thereof). The input(s) 1148 can be passed to an XR runtime application programming interface (API) 1140, an uplink media management subsystem 1144, an XR presentation API 1150, a thin presentation engine 1142, a media access function (MAF) API 1154, a MAF subsystem 1160, and/or a cellular network subsystem 1176 that can couple to a cellular network 1178. In some examples, the XR application 1146 is a video game. In some examples, the XR runtime API 1140 may be an OpenXR API.

The XR system 1100 is configured for split rendering, and thus at least a subset of processing tasks are to be performed by the XR management system 1104 and/or the XR processing device 1106 (e.g., edge node, remote server) that is coupled to the XR system 1100 via the cellular network subsystem 1176 of the XR management system 1104 and/or the cellular network 1178, and/or that is part of the cellular network 1178 (e.g., an edge node). For instance, the sensor data captured by the XR interface device 1102 (e.g., as discussed above) and/or associated metadata is sent from the XR interface device 1102 to the XR management system 1104, for instance using the XR runtime API 1140. The XR runtime API 1140 also receives the user input(s) 1148 and/or associated metadata. These inputs to the XR runtime API 1140 are collected and/or combined (e.g., via the uplink media management subsystem 1144) and sent as XR metadata 1152 (and/or sensor data) to the media access functions subsystem 1160 of the XR management system 1104. The media access functions subsystem 1160 encodes, compresses, and/or encrypts the XR metadata 1152 (and/or sensor data), for instance via codecs (e.g., metadata codecs 1162, haptics codecs 1164, video codecs 1166, and/or audio codecs 1168), to generate uplink compressed media 1172 that is sent to the XR processing device 1106 through the cellular network subsystem 1176 and/or the cellular network 1178 for further processing.

The XR processing device 1106 decrypts, decompresses, decodes, and/or processes the uplink compressed media 1172 via a media access functions subsystem 1196 of the XR processing device 1106 (e.g., via codecs like those of the media access functions subsystem 1160) to extract XR metadata 1152 (and/or sensor data). The XR processing device 1106 can include an instance of the XR application 1146, which can also provide inputs to a media access functions API 1155 of the media access functions subsystem 1196 of the XR processing device 1106. Likewise, the media access functions subsystem 1196 of the XR processing device 1106 can provide inputs to the XR application 1146 via the media access functions API 1155. The XR processing device 1106 provides the XR metadata 1152 (and/or sensor data) from the media access functions subsystem 1196 to a set of subsystems that ultimately render XR content (e.g., virtual content), provided from the set of subsystems back to the media access functions subsystem 1196 as prerendered media 1158 (e.g., 2D media, 2.5D media, in some cases pose dependent media that is dependent on the pose of the XR interface device 1102). The set of subsystems include an XR shim layer 1198, an XR runtime API 1180 (e.g., which can be associated with the XR runtime API 1140), a presentation engine 1182 with a corresponding XR presentation API 1186 that interfaces with the XR application 1146, a scene manager 1184 with a corresponding XR scene API 1188 that interfaces with the XR application 1146, and/or the XR application 1146 itself. The presentation engine 1182 includes a visual renderer 1190 that renders visual content, such as 3D models, textures, 2D images, sets of images (e.g., 2.5D visual content), videos, or a combination thereof, which can be part of the prerendered media 1158. The presentation engine 1182 includes a haptic renderer 1192 that renders haptic content, for instance indicating haptic feedback that is to be output using the haptic actuator(s) 1122 of the XR interface device 1102 and/or haptic actuator(s) of associated device(s) (e.g., a controller, the XR management system 1104, or another device). This haptic feedback can also be part of the prerendered media 1158. The presentation engine 1182 includes an audio renderer 1194 that renders audio content, for instance rendering music, voices, sound effects, and/or other sound clips or audio cues based on a real environment, virtual environment, augmented environment, mixed environment, and/or pose of the XR interface device 1102. The audio content can also become part of the prerendered media 1158.

The media access functions subsystem 1196 encodes, compresses, and/or encrypts the prerendered media 1158, for instance via codecs (e.g., metadata codecs, haptics codecs, video codecs, and/or audio codecs), to generate downlink compressed media 1174 that is sent to the XR management system 1104 through the cellular network 1178 and/or the cellular network subsystem 1176 to be directed back to the XR interface device 1102. In some examples, the XR processing device 1106 also includes its own cellular network subsystem similar to the cellular network subsystem 1176 of the XR management system 1104. In some examples, the media access functions subsystem 1160 decodes, decompresses, and/or decrypts the downlink compressed media 1174, for instance via codecs (e.g., metadata codecs 1162, haptics codecs 1164, video codecs 1166, and/or audio codecs 1168), to extract prerendered media 1158 and/or a scene description 1156, and pass these to the thin presentation engine 1142 (e.g., which manages presentation and/or composition), a corresponding XR presentation API 1150, and/or the XR runtime API 1140. The prerendered media 1158 and/or scene description 1156 can be passed through the tethering communication interface 1132 back to the XR interface device 1102, where components of the prerendered media 1158 can be output. For instance, visual XR content from the prerendered media 1158 is output using the visual composition subsystem 1114 and eye buffer display 1120, haptic feedback XR content from the prerendered media 1158 is output using the haptic subsystem 1116 and haptic actuator(s) 1122, and audio XR content from the prerendered media 1158 is output using the audio composition subsystem 1118 and speaker(s) 1124.

The split rendering process of the XR system 1100 illustrated in FIG. 11 can add another connection, this time between the XR management system 1104 and the XR processing device 1106, that can include additional stages of encoding, compressing, encrypting, decoding, decompressing, decrypting, and/or transcoding. In some examples, this mirrors, and adds to, the technical problems the split rendering process 900, for instance including restricted formats, restricted bandwidth, protocol misalignment, security misalignment, transcoding latency, transcoding power usage, and other issues discussed herein. Some of these technical problems can relate to insufficient communication between the XR interface device 1102, the XR management system 1104, and/or the XR processing device 1106, which can be solved via communication of important contextual information about the XR interface device 1102 (and/or the tethering communication interface 1132) from the XR management system 1104 to the XR processing device (e.g., as processing instructions) as discussed herein (e.g., as in FIGS. 12, 13, and/or 14). Some of these technical problems can relate to transcoding, for instance at the XR management system

Figure 12:
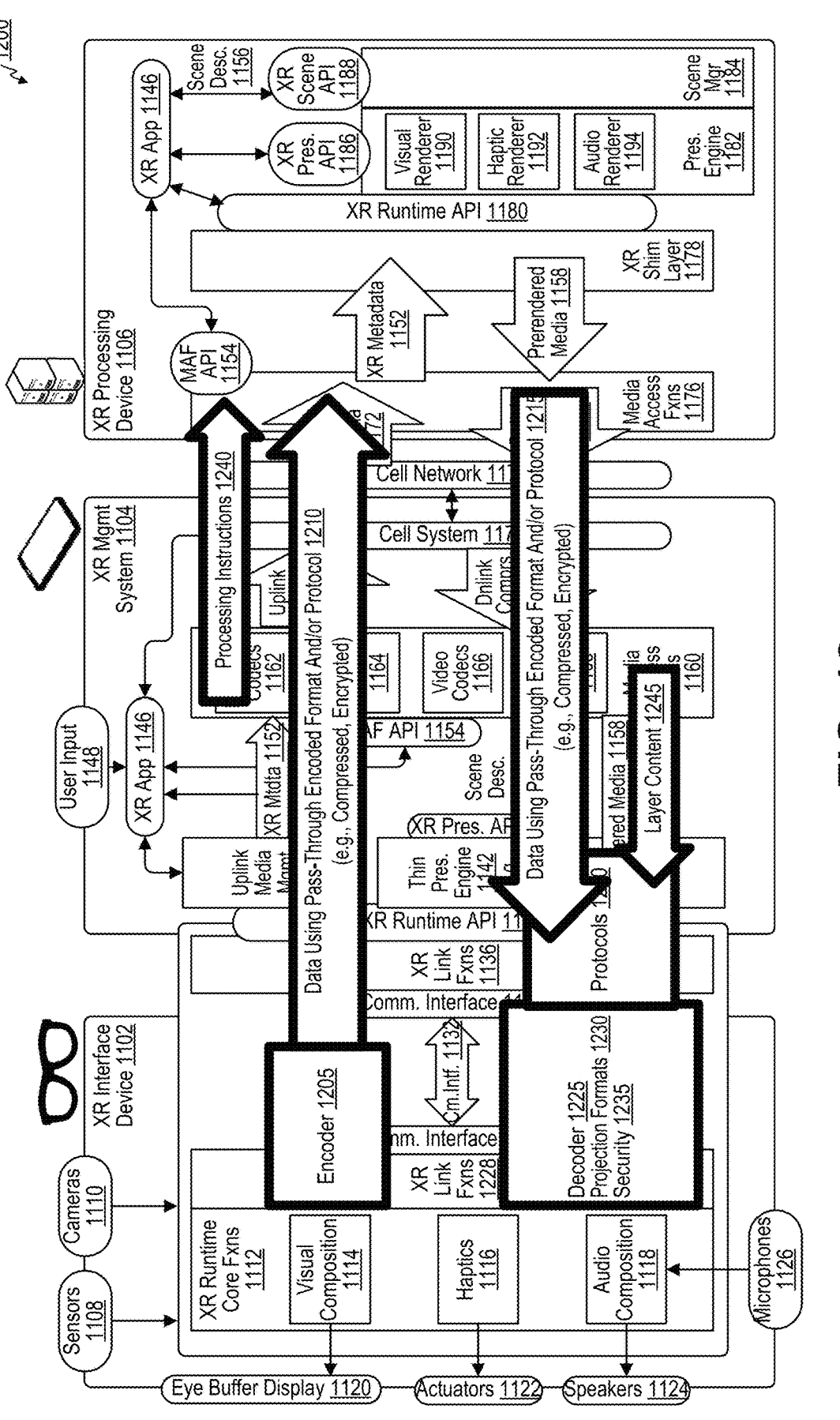
FIG. 12 is a block diagram illustrating use of passed-through formats for remote rendering in the context of the architecture of an extended reality (XR) system of FIG. 11, in accordance with some examples.

1104, which can be solved by avoiding or minimizing transcoding as discussed herein (e.g., as in FIGS. 10, 12, 13, and/or 14).

FIG. 12 is a block diagram illustrating a process 1200 for using passed-through encoded formats and/or protocols (e.g., passed-through encoded formats and/or protocols 1210, passed-through encoded formats and/or protocols 1215) for remote rendering in the context of the architecture of an extended reality (XR) system of FIG. 11. Under the process 1200, the XR interface device 1102 uses an encoder 1205 to encode, compress, and/or decrypt its sensor data and/or metadata into the passed-through encoded formats and/or protocols 1210, which the XR management system 1104 receives and passes on to the XR processing device 1106 without decoding, decompressing, or decrypting.

In some examples, the XR management system 1104 separately obtains metadata about the capabilities of the XR interface device 1102 and/or of the tethering communication interface 1132 (and/or the XR processing device 1106), and generates processing instructions 1240 for the XR processing device 1106 with indications for the XR processing device 1106 on how to process the XR interface device 1102. In some examples, the processing instructions 1240 can identify, or be based on, characteristic(s) of the XR interface device 1102, such as an image capture resolution, an image capture size, an image capture color space, an image display resolution, an image display size, an image display color space, the projection formats 1230, a pose, a location, an orientation, a bandwidth, a bit rate, a baud rate, a transfer speed, a transfer protocol, an encryption scheme, a security scheme (e.g., security 1235), a temperature, a battery level (or battery life), or a combination thereof. In some examples, the processing instructions 1240 can identify, or be based on, characteristic(s) of the tethering communication interface 1132 (e.g., local communication interface), such as connection type (e.g., wireless or wired), a bandwidth, a bitrate, a baud rate, a transfer speed, a transfer protocol, an encryption scheme, a security scheme, a connection quality, or a combination thereof. In some examples, the processing instructions 1240 can identify, or be based on, characteristic(s) of the XR processing device 1106, a capability, a capacity, a processing power, a bandwidth, a bit rate, a baud rate, a transfer speed, a transfer protocol, an encryption scheme, or a security scheme.

In an illustrative example, if the display(s) of the XR interface device 1102 (e.g., the eye buffer display 1120) output at a 1080P resolution, the XR management system 1104 can generate processing instructions 1240 for the XR processing device 1106 indicating not to render content for a resolution higher than 1080P (e.g., not to render content at a 2K or 4K resolution), and can send those processing instructions 1240 to the XR processing device 1106 to follow, to avoid the XR processing device 1106 using unnecessary computational resources, bandwidth, power, heat generation, latency, and the like. Similarly, if the tethering communication interface 1132 has a maximum bit rate of 30 megabits per second, the XR management system 1104 can generate processing instructions 1240 for the XR processing device 1106 indicating not to render content that would require a higher bitrate than 30 megabits per second (e.g., 100 megabits per second) to transfer in time to be output by the XR interface device 1102 with more than a threshold amount of latency, and can send those processing instructions 1240 to the XR processing device 1106 to follow, to avoid the XR processing device 1106 using unnecessary computational resources, bandwidth, power, heat generation, and the like, and being unable to send the rendered XR content on time to the XR processing device 1106. Similarly, if the tethering communication interface 1132 has a poor connection quality (e.g., of a wireless connection), the XR management system 1104 can generate processing instructions 1240 for the XR processing device 1106 requesting that the XR processing device 1106 render simplified content that would use less than a threshold bitrate, and can send those processing instructions 1240 to the XR processing device 1106 to follow, to improve the probability that the entirety of the XR content arrives at the XR interface device 1102, and to make additional room (e.g., in terms of bandwidth and/or bitrate) for error correction data to make up for the poor connection quality. Similar processing instructions 1240 can be generated and sent if The XR interface device 1102 has a low battery (e.g., below a threshold) or is at a high temperature (e.g., above a threshold) to try to conserve the battery power of the XR interface device 1102 and/or to try to reduce or maintain the temperature of the XR interface device 1102 (or at least slow down the temperature increase of the XR interface device 1102). In Under the process 1200, the XR processing device 1106 uses the media access functions subsystem 1196 (e.g., the decoders and/or codecs therein) to decode, decompress, and/or decrypt the passed-through encoded formats and/or protocols 1210. The XR processing device 1106 can also receive the processing instructions 1240 from the XR management system 1104. The processing device 1106 can process the sensor data and/or metadata decoded from the passed-through encoded formats and/or protocols 1210 according to the processing instructions 1240 to generate XR content (e.g., the prerendered media 1158). The XR processing device 1106 uses the media access functions subsystem 1196 (e.g., the encoders and/or codecs therein) to encode, compress, and/or encrypt the XR content (e.g., the prerendered media 1158) to generate passed-through encoded formats and/or protocols 1215, which the XR management system 1104 receives and passes on to the XR interface device 1102 without decoding, decompressing, or decrypting. Some examples, the processing instructions 1240 can indicate details of data receipt at the XR interface device 1102, such as protocols 1220, decoder 1225, projection formats 1230, and/or security 1235, so that the XR processing device 1106 generate the passed-through encoded formats and/or protocols 1215 using formats and/or protocols and/or security schemes that align with the formats and/or protocols and/or security schemes that are usable by the XR interface device 1102.

In some examples, the XR management system 1104 can generate layer content 1245 and send the layer content 1245 over to the XR interface device 1102. The ability of the XR management system 1104 to directly modify the XR content is limited without decoding, decompressing, and/or decrypting the passed-through encoded formats and/or protocols 1215. However, the XR management system 1104 can generate layer content 1245 that can be layered over or underneath at least portion(s) of the XR content according to a layering arrangement, and can sent that layer content 1245 to the XR interface device to output without decoding, decompressing, and/or decrypting the passed-through encoded formats and/or protocols 1215. In some illustrative examples, the layer content can include content from the XR application 1146, such as a counter indicating time remaining in a game match (e.g., of a video game or a sports match), a counter indicating wins or losses or score(s) or other statistics by player(s) in a game (e.g., of a video game or a sports match), message(s) received by the user from other users (e.g., other players), message(s) sent from the user to other users (e.g., other players), user interface elements, elements that can be rendered by the XR management system 1104 separately from the XR content that is rendered by the XR processing device 1106, or a combination thereof.

Compared to the split rendering process used by the XR system 1100 in FIG. 11, the process 1200 involves fewer operations (e.g., fewer rounds of encoding and/or decoding), reduced complexity (e.g., fewer potential points of failure), and can result in reduced latency, power usage, battery drain, heat generation, and usage of computational resources at the XR interface device 1102, the XR management system 1104, and the XR processing device 1106. In some examples, the architecture illustrated in FIG. 12 (e.g., the XR system 1100 using the process 1200) may be referred to as a SmarTAR architecture.

In some examples, under the process 1200, the XR system 1100 may perform a capability exchange, for instance via the processing instructions 1240. In some examples, the XR management system 1104 uses at least one capability query to check with the XR interface device 1102 on what is supported by the XR interface device 1102. Examples for such checks include, for instance, the resolution of the format, the quality degradation incurred by the link and/or the coding, the security framework and capabilities of the XR interface device 1102, dynamic metrics and/or information of the signal quality and/or signal strength of the tethering communication interface 1132, the audio and/or video and/or haptic feedback decoding capabilities of the XR interface device 1102, the security capabilities of the XR interface device 1102, the security framework and capabilities of the XR interface device 1102, statics and dynamic updates on the bitrate and/or delay of the tethering communication interface 1132, or a combination thereof. In some examples, based on this information, the XR management system 1104 can decides whether to use the process 1200 of FIG. 12 or the process illustrated in FIG. 11, whether to use compressed or uncompressed formats, adapt bitrates and/or resolution associated with rendered XR content, or combinations thereof.

The process 1200 may be used in various communication services between an XR management system 1104 and an XR processing device 1106, such as (1) for a media streaming client application, dynamically selecting appropriate content formats, bitrates and qualities based on dynamic connection metrics and/or statistics; (2) dynamically negotiating between the XR interface device 1102, the XR management system 1104, and/or the XR processing device 1106 to dynamically support the appropriate content formats, bitrates and qualities for communications; (3) performing split rendering, or (4) a combination thereof.

Some benefits of the process 1200, and the usage of the pass-through compressed formats and protocols between the XR interface device 1102 and the XR processing device 1106 (through the XR management system 1104), include: lower latency (no transcoding needed), improved (e.g., maximized) quality (no transcoding), lower power consumption, improved reliability (reliability is dealt with end to end), improved bitrate (bitrate is dealt with end to end), improved security (security is dealt with end to end), other improvements discussed herein, or a combination thereof. Local data can still be added by the XR management system 1104 (e.g., as processing instructions 1240 and layer content 1245), even with usage of the pass-through compressed formats and protocols between the XR interface device 1102 and the XR processing device 1106 (through the XR management system 1104) under the process 1200.

Certain aspects of the usage of the pass-through compressed formats and protocols between the XR interface device 1102 and the XR processing device 1106 (through the XR management system 1104) can be handled on the API level. In some examples, an XR API (e.g., an OpenXR API or extension) may be used with the architecture illustrated in the block diagram of FIG. 11 and/or FIG. 12, with or without the usage of the pass-through compressed formats and protocols of the process 1200 between the XR interface device 1102 and the XR processing device 1106 (through the XR management system 1104). In some examples, one or more of the devices (the XR interface device 1102, the device, the XR management system 1104, and/or the XR processing device 1106) can communicate to handle timing of communications (e.g., of the pass-through compressed formats and protocols) according to a predetermined schedule and/or according to a modifiable schedule.

In some examples, the architecture illustrated in the XR system 1100 and/or process 1200 may include certain features or extensions. For instance, in some examples, the split rendering operation can be defined by the end-point capabilities of the XR interface device 1102. For parts of the submitted swap chain buffers, one layer may be sent over in compressed from, and a locally generated layer may be sent over in raw form (e.g., the layer content 1245).

In some examples, capabilities and configurations can be checked statically (e.g., available projection formats, security, decoders, and/or protocol). In some examples, capabilities and configurations can be checked dynamically (e.g., bitrate measurements) In some examples, metrics and observations also run across the pass-through compressed formats and protocols (e.g., audio, video, and/or pose).

In some examples, features or extensions can include support in the runtime query for supported formats additional information (that include the audio and video decoding capabilities of the XR interface device 1102, the security capabilities of the XR interface device 1102, the security framework and capabilities of the XR interface device 1102, and/or statically and dynamically the bitrate and delay of the tethering communication interface 1132). The features or extensions can include support of usage of this provided static and dynamic information for example in the XR management system 1104 to select the appropriate content formats, bitrates, codecs and qualities, possibly in a dynamic fashion, a communication client to negotiate with the XR processing device 1106 to support the appropriate content formats, codecs bitrates and qualities, possibly in a dynamic fashion, and/or in split rendering for which the formats are provided accordingly as in the process 1200. The features or extensions can include announcing appropriate information from the XR processing device 1106 to the XR management system 1104 (or vice versa) in order to be able to make such selections. In some examples, details of these features or extensions can be added to a streaming manifest, the session description protocol, or to a scene description.

In some examples, the media format is passed through from the cellular network 1178 over the tethering communication interface 1132 using the XR runtime API 1140 (e.g., OpenXR API or another XR API). This API use allows the XR management system 1104 to also add local data as layer content 1245, for example that can be added on different layers than the XR content generated by the XR processing device 1106. Pass-through may include passing the encoded and/or compressed media data, but can also include, and/or be formatted according to, a selected security frame work and/or protocol, which can depend capabilities and/or settings of the XR interface device 1102.

FIG. 13 is a block diagram illustrating an example architecture of an extended reality (XR) system 1300 that performs XR management to pass compressed formats. The XR system 1300 is illustrated in FIG. 13 as using an approach in which compressed formats are exchanged via the XR runtime API 1320 (e.g., XR runtime API 1140). The XR system of FIG. 13 passes pose and other data in compressed formats 1330 (e.g., data using pass-through encoded format and/or protocol 1210) from tracking system(s) 1305 (e.g., of XR runtime subsystem 1112) and a corresponding encoder 1310 (e.g., of XR runtime subsystem 1112 and/or XR link functions 1128), through a link 1315 (e.g., tethering communication interface 1132) and an XR runtime API 1320, to a scene manager and game engine 1335 (e.g., scene manager 1184, presentation engine 1182, and/or XR application 1146). The XR system of FIG. 13 passes scene/game/virtual content (e.g., prerendered media 1158) from the scene manager and game engine and a corresponding encoder 1340 in a pass-through compressed format and protocol 1345 (e.g., pass-through encoded format and/or protocol 1215) through a link 1350 (e.g., the tethering communication interface 1132) and the XR runtime API 1320 to a decoder 1355 (e.g., of XR runtime subsystem 1112 and/or XR link functions 1128) and a subsystem associated with composition and warping of content 1360 (e.g., XR runtime subsystem 1112, visual composition subsystem 1114, haptics subsystem 1116, and/or audio composition subsystem 1116). An application (e.g., AR, MR, VR, and/or XR application) (e.g., XR application 1146) can be associated with the XR runtime API 1320.

In some examples, the XR system 1300 can include and/or use various features or extensions, such as extensions to swapchain image management associated with OpenXR. For instance, in some examples, xrEnumerateSwapchain-Formats enumerates the texture formats supported by the current session. The type of formats returned are dependent on the graphics API specified in xrCreateSession.

In some examples, certain graphics APIs, such as Vulkan, permit compressed image formats. In some examples, the compressed image formats used can rely on compressed data formats matching certain formats, protocols, and/or standards, such as those associated with Khronos.

In some examples, the XR runtime API 1320 references use of video compression formats for each of the swap chain images. In some examples, the XR systems and methods of FIG. 10 and FIGS. 12-14 allow for formats that add compressed video formats as swap chain images for which: a time stamp is included to indicate a target display time (e.g., an RTP time stamp), a compressed format includes a render pose, and/or a compressed texture format is handed over.

In some examples, swap chain image management with compressed data only applies for parts of the submitted swap chain buffers. For instance, in an illustrative example, one layer may be sent over in compressed from (e.g., data using pass-through encoded format and/or protocol 1215), whereas a locally generated layer may be sent over in raw form (e.g., layer content 1245). The synchronization of these layers can be performed by the XR management system 1104, for instance at runtime. This can apply for video, audio, haptics, and other output types, with a compressed bitstream handed from the XR processing device 1106 to the XR interface device 1102 by the XR management system 1104.

For uplink media data from the XR interface device 1102, action and/or pose data may be passed on in compressed form as received in the XR interface device 1102 to the XR processing device 1106. The XR Runtime API may even provide such data in compressed (for sending to XR processing device 1106) and in raw form (for processing on the XR management system 1104)

In order to support tethered tethering communication interface 1132s and XR interface device 1102-based endpoints properly, a framework of the XR system can provide adaptability to the capabilities of the XR interface device 1102 to maximize end-to-end quality in terms of signal quality, latency, power consumption, etc. In order to support this, the XR system can support in the runtime query for supported formats additional information, for instance that include the resolution of the format, the quality degradation incurred by the combination of the tethering communication interface 1132 and the coding, the security framework and capabilities of the device, dynamically providing the metrics and information of the signal quality on the tethering communication interface 1132, the audio and video decoding capabilities of the XR interface device 1102, the security capabilities of the XR interface device 1102, the security framework and capabilities of the device, statically and dynamically the bitrate and delay of the tethering communication interface 1132. The XR system can support usage of provided static and dynamic information, for example in XR management system 1104, to select the appropriate content formats, bitrates and qualities, possibly in a dynamic fashion, to negotiate with the XR processing device 1106 to support the appropriate content formats, bitrates and qualities, in some cases in a dynamic fashion, with split rendering in which the formats are provided from the rendering by the XR processing device 1106. The XR system can announce appropriate information from the XR interface device 1102 and/or the XR processing device 1106 to the XR management system 1104 to allow the XR management system 1104 to make such selections of format, protocol, security, and the like. In some examples, protocols may include stage-3 protocols such as Dynamic Adaptive Streaming over HTTP (DASH), ISO base media file format (ISO BMFF), Session Description Protocol (SDP), Real-time Transport Protocol (RTP), Secure RTP (SRTP), RTP Control Protocol (RTCP), or combinations thereof.

FIG. 14 is a flow diagram illustrating a process 1400 for extended reality (XR) management. The process 1400 may be performed by an XR management system. In some examples, the XR management system can include, for example, the image capture and processing system 100, the image capture device 105A, the image processing device 105B, the image processor 150, the ISP 154, the host processor 152, the XR system 200, the HMD 310, the mobile handset 410, the XR system 505, the XR processing device 510, the XR system 605, the XR system 700, the XR interface device 702, the XR management system 704, the XR system 1100, the XR interface device 1102, the XR management system 1104, the XR processing device 1106, the XR system 1300, the computing system 1500, the processor 1510, an apparatus, a system, a non-transitory computer-readable medium coupled to a processor, or a combination thereof.

At operation 1405, the XR management system (or at least one component thereof) is configured to, and can, receive sensor data from an XR interface device (e.g., XR interface device 702, XR interface device 1102) having at least one sensor.

Examples of the sensor includes the image sensor 130, the first camera 330A, the second camera 330B, the third camera 330C, the fourth camera 330D, the first camera 430A, the second camera 430B, the third camera 430C, the fourth camera 430D, the input device 1545, another image sensor described herein, another sensor described herein, or a combination thereof. Examples of the image includes an image captured by the any of the examples of the image sensor listed above.

In some examples, the XR interface device is a headset (e.g., HMD 310, glasses) that is coupled to the XR management system using a local communication interface (e.g., tethered communication interface 732, tethered communication interface 1132, link 1315, link 1350), such as a local wireless communication interface, a wired communication interface, or a combination thereof. In some examples, the XR interface device is a mobile device (e.g., mobile handset 410, phone, tablet, watch, wearable device) that is coupled to the XR management system using a local communication interface, such as a local wireless communication interface, a wired communication interface, or a combination thereof. In some examples, the XR management system is a mobile device (e.g., mobile handset 410, phone, tablet, watch, wearable device) that is coupled to the XR interface device using a local communication interface, such as a local wireless communication interface, a wired communication interface, or a combination thereof. Local wireless communication interfaces can include, for instance, Bluetooth® connection(s), personal area network (PAN) connection(s), Wi-Fi connection(s), wireless local area network (WLAN) connection(s), or a combination thereof.

At operation 1410, the XR management system (or at least one component thereof) is configured to, and can, generate, based on the receipt of the sensor data from the XR interface device, processing instructions (e.g., processing instructions 1240) for an XR processing device (e.g., XR processing device 1106) to process the sensor data to generate XR content. At operation 1415, the XR management system (or at least one component thereof) is configured to, and can, send the sensor data and the processing instructions to the XR processing device.

In some examples, the sensor data received from the XR interface device and sent to the XR processing device includes (and/or is) compressed sensor data.

In some examples, at least the portion of the sensor data is uncompressed as received from the XR interface device, and the XR management system (or at least one component thereof) is configured to, and can, compress at least a portion of the sensor data before sending the sensor data to the XR processing device. For instance, the compression can be performed using the codecs of the media access functions 1160 of the XR management system 1104. In some examples, a second portion of the sensor data is compressed as received from the XR interface device and the XR management system (or at least one component thereof) is configured to, and can, keep the second portion of the sensor data compressed (e.g., not decompress it) before sending the sensor data to the XR processing device.

In some examples, generating the processing instructions based on the receipt of the sensor data from the XR interface device (as in operation 1410) includes generating at least a subset of the processing instructions based on an uncompressed portion of the sensor data that is uncompressed as received from the XR interface device. In some examples, a compressed portion of the sensor data is compressed as received from the XR interface device. In some examples, for instance, image data (of the sensor data) is compressed as received from the XR interface device, but metadata (of the sensor data) is uncompressed as received from the XR interface device. The XR management system (or at least one component thereof) is configured to, and can, generate the processing instructions based on the metadata, which may include sufficient information about the images (e.g., resolution, storage size, compression format, and the like) that the XR management system (or at least one component thereof) is able to generate processing instructions for processing the images without decompressing the images themselves.

In some examples, generating the processing instructions based on the receipt of the sensor data from the XR interface device (as in operation 1410) includes generating at least a subset of the processing instructions based on at least one characteristic of a local communication interface (e.g., tethered communication interface 732, tethered communication interface 1132, link 1315, link 1350, wires communication interface, local wireless communication interface) between the apparatus and the XR interface device over which the sensor data is received from the XR interface device. In some examples, the at least one characteristic includes at least one of a bandwidth, a bitrate, a baud rate, a transfer speed, a transfer protocol, an encryption scheme, a connection quality, a security scheme, or a combination thereof. For instance, the processing instructions can instruct the XR processing device not to generate a larger amount of data than the local communication interface would be capable of transferring to the XR interface device.

In some examples, generating the processing instructions based on the receipt of the sensor data from the XR interface device (as in operation 1410) includes generating at least a subset of the processing instructions based on at least one characteristic of the sensor data as received from the XR interface device, for instance as obtained via metadata associated with the sensor data. In some examples, the at least one characteristic includes at least one of a file size, an image size, an image resolution, a frame rate, an amount of channels (e.g., color channels, depth channels), an encoding scheme, an encryption scheme, or a combination thereof. For instance, the processing instructions can instruct the XR processing device to render virtual content at a size that is appropriate for the image size and/or image resolution of the sensor data, so that the XR processing device does not waste computational resources rendering the virtual content at a larger size than will be usable in the XR content given the image size and/or image resolution of the sensor data.

In some examples, generating the processing instructions based on the receipt of the sensor data from the XR interface device (as in operation 1410) includes generating at least a subset of the processing instructions based on at least one characteristic of the XR interface device. In some examples, the at least one characteristic includes at least one of an image capture resolution, an image capture size, an image capture color space, an image display resolution, an image display size, an image display color space, a pose, a location, an orientation, a bandwidth, a bit rate, a baud rate, a transfer speed, a transfer protocol, an encryption scheme, a security scheme, a temperature, a battery level, or a combination thereof. For instance, the processing instructions can instruct the XR processing device to render virtual content at a size that is appropriate for the image display resolution and/or the image display size of the display of the XR interface device, so that the XR processing device does not waste computational resources rendering the virtual content at a larger size than will be usable in the XR content given the image display resolution and/or the image display size of the display of the XR interface device. Similarly, the processing instructions can instruct the XR processing device to render virtual content using colors that will work well on the display of the XR interface device given the image display color space of the display of the XR interface device. Similarly, the processing instructions can instruct the XR processing device to adjust perspective(s) of certain element(s) (e.g., virtual content) in the XR content based on the pose, the location, the orientation, and the like. Similarly, the processing instructions can instruct the XR processing device to limit how much XR content it is generating (e.g., in terms of image resolution, image size, frame rate, or a combination thereof) based on bandwidth, bit rate, baud rate, transfer speed, transfer protocol, encryption scheme, security scheme, temperature, battery level, or a combination thereof.

In some examples, generating the processing instructions based on the receipt of the sensor data from the XR interface device (as in operation 1410) includes generating at least a subset of the processing instructions based on at least one characteristic of the XR processing device. In some examples, the at least one characteristic includes at least one of a capability, a capacity, a processing power, a bandwidth, a bit rate, a baud rate, a transfer speed, a transfer protocol, an encryption scheme, a security scheme, or a combination thereof. For instance, the processing instructions can be generated to instruct the XR processing device to generate XR content within the capabilities of the XR processing device. The XR processing instructions should take the capabilities of the XR processing device into account to ensure that the XR processing instructions are not impossible or unlikely for the XR processing device to complete on time.

In some examples, the processing instructions are indicative of at least a pose of virtual content to be rendered as part of the XR content. In some examples, the virtual content is associated with a video game. For instance, the pose of the virtual content to be rendered as part of the XR content can be based on the pose of the XR interface device (e.g., is the user looking up or down), based on the video game (e.g., is the object or character represented by the virtual content tilted or rotated or moving within the environment of the video game), or a combination thereof.

In some examples, the XR management system (or at least one component thereof) is configured to, and can, manage an application programming interface (API). In some examples, receipt of the sensor data from the XR interface device (of operation 1405) is associated with a first API call to the API. In some examples, the receipt of the XR content from the XR processing device (of operation 1420) is associated with a second API call to the API.

At operation 1420, the XR management system (or at least one component thereof) is configured to, and can, receive the XR content from the XR processing device. The XR content can include, for instance, downlink media 774, primitives buffers 758, scene description 756, data using the pass-through encoded formats 1015, scene description 1156, prerendered media 1158, downlink compressed media 1174, data using the pass-through encoded format and/or protocol 1215, data using pass-through compressed format and/or protocol 1345, or a combination thereof.

In some examples, the XR processing device includes an edge node, such as an edge node in a cellular network (e.g., a 5G cellular network). In some examples, the XR processing device includes a server.

The XR content can be a processed variant of the sensor data. For instance, in some examples, the sensor data includes a representation of an environment around the XR interface device (e.g., around the user), and the XR content includes a processed variant of the representation of the environment, for instance adding rendered objects, textures, colors, shading, lighting effects, or a combination thereof. In an illustrative example, the sensor data includes image(s) and/or depth data of a room that the user of the XR interface device is in, and the XR content can maintain aspects of that room (e.g., the dimensions, where the walls are, where certain objects are in the room) while modifying the look of the room visually to look like the inside of a space ship, a fighting arena, a pirate ship, an outdoor space, or some other type of environment having a specific theme and/or style and/or appearance, depending on the XR application 246 (e.g., depending on the video game). In some examples, objects in the real-world environment (e.g., as tracked in the sensor data) may be maintained (in terms of position and/or orientation and/or dimensions) in the XR content, but may be processed to look different (e.g., to look like another object)—for instance, a couch may be made to look like a set of crates or boxes to improve matching with the theme and/or style and/or appearance of the XR application 246 (e.g., of the video game). In some examples, virtual objects and/or characters may be added into the XR content that are not present in the real-world environment (e.g., as tracked in the sensor data), such as other characters representing other people (e.g., other players in a multiplayer game), other characters not representing other people (e.g., non-player character(s) (NPC(s))), items, decorations, or combinations thereof.

At operation 1425, the XR management system (or at least one component thereof) is configured to, and can, generate layer content (e.g., layer content 1245). At operation 1430, the XR management system (or at least one component thereof) is configured to, and can, send the XR content and the layer content to the XR interface device to cause the XR interface device to output the XR content and the layer content in a layered arrangement.

In some examples, the layer content includes content that can be added by the XR management system, for instance on another layer than the XR content (e.g., overlaid over the XR content or underlaid under the XR content), without having to directly modify (e.g., and thus decompress and/or decode) the XR content at the XR management system. For instance, in some examples, the layer content can include a clock, a timer, a frame rate counter (e.g., in frames per second (FPS)), a mission objective in a video game, a score in the video game, statistics associated with a player in the video game, a heads-up display associated with the player and/or the video game, statistics associated with a team in the video game, statistics associated with a match or tournament in the video game, outlines or overlays that highlight certain elements in the XR content in a specific color (e.g., a highlight or outline in red, orange, yellow, green, blue, violet, or another color), names of certain items or characters, or a combination thereof. In an illustrative example, the sensor data includes image(s) and/or depth data of a real-world environment that the user of the XR interface device is in, the XR content is a processed variant of the sensor data that transforms the real-world environment into a stylized environment (e.g., themed to look like a space ship or other fictional area or non-fictional area) with virtual content (e.g., virtual characters and/or items) incorporated into the stylized environment but with certain aspects of the real-world environment (e.g., dimensions) maintained, and the layer content includes a heads-up display of the user's player character to be overlaid over the XR content, names of other characters in the XR content to be overlaid over the XR content, a colored outline or colored highlight that emphasizes a goal (e.g., a ball or other object, an exit from a room, etc.) in the stylized environment to be overlaid over the XR content, a video game score to be overlaid over the XR content, or a combination thereof.

In some examples, a portion of the layer content is configured to be, and can be, overlaid over at least a portion of the XR content in the layered arrangement. For instance, in some examples, the layer content can be layered in front of the XR content (or one or more layer(s) thereof) from the perspective of the user (and/or from the perspective shown on the display(s) of the XR interface device). In some examples, at least a portion of the XR content is configured to be, and can be, overlaid over at least a portion of the layer content in the layered arrangement. For instance, in some examples, the XR content can include a gap, or itself can include layers, and the layer content can be layered behind one or more layer(s) of the XR content from the perspective of the user (and/or from the perspective shown on the display(s) of the XR interface device).

In some examples, the XR interface device performs further processing on the XR content and/or the layer content before the XR interface device displays the XR content and/or the layer content on its display(s) (e.g., display(s) 340, display 440). For instance, in some examples, the XR interface device can apply a filter to the XR content and/or the layer content (e.g., as layered according to the layered arrangement). In some examples, the XR interface device can resize, rescale, warp, distort, rotate, reorient, translate, or otherwise modify the XR content and/or the layer content (e.g., as layered according to the layered arrangement), for instance to better fit the XR content and/or the layer content to the dimensions, orientation, and/or angles of the display(s) relative to perspective(s) of the eye(s) of the user.

In some examples, the processes described herein (e.g., the respective processes of FIGS. 1, 2, 5, 6, 7, 8, 9, 10, 11, 12, 13, the process 1400 of FIG. 14, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the XR system 200, the HMD 310, the mobile handset 410, the XR system 505, the XR processing device 510, the XR system 605, the XR system 700, the XR interface device 702, the XR management system 704, the XR system 1100, the XR interface device 1102, the XR management system 1104, the XR processing device 1106, the XR system 1300, the computing system 1500, the processor 1510, an apparatus, a system, a non-transitory computer-readable medium coupled to a processor, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
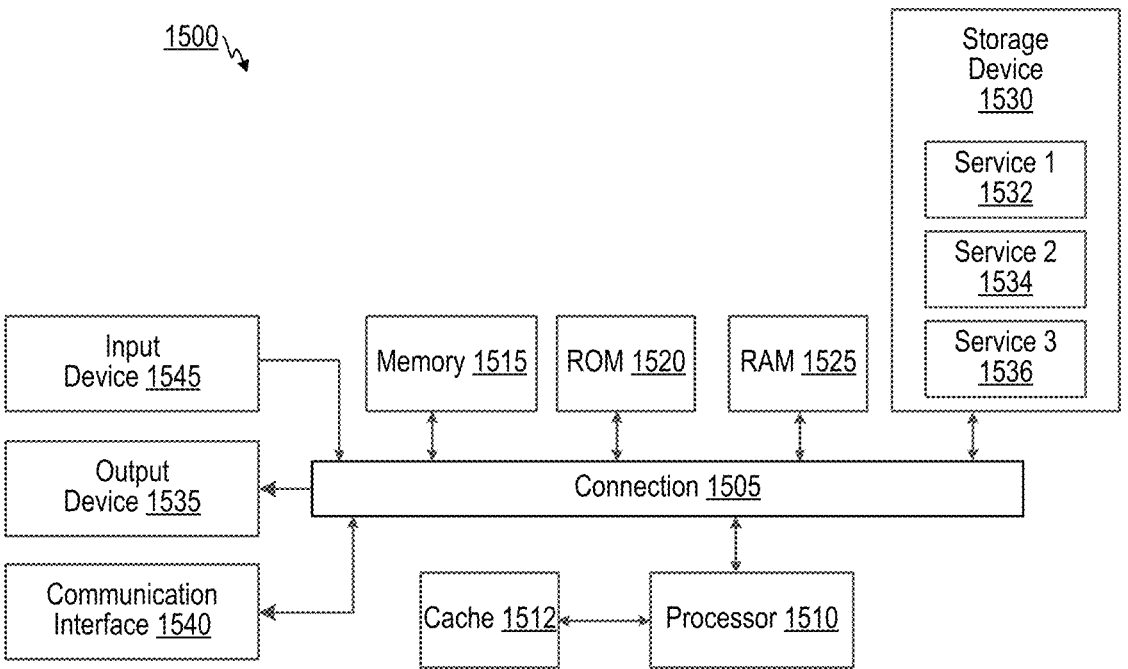
FIG. 15 is a diagram illustrating an example of a computing system for implementing certain aspects described herein.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for extended reality (XR) management, the apparatus comprising: at least one memory; and at least one processor coupled to the at least one memory, the at least one processor configured to: receive sensor data from an XR interface device having at least one sensor; generate, based on the receipt of the sensor data from the XR interface device, processing instructions for an XR processing device to process the sensor data to generate XR content; send the sensor data and the processing instructions to the XR processing device; receive the XR content from the XR processing device; generate layer content; and send the XR content and the layer content to the XR interface device for the XR interface device to output the XR content and the layer content in a layered arrangement.

Aspect 2. The apparatus of Aspect 1, wherein the XR interface device is a headset that is coupled to the apparatus using a local communication interface.

Aspect 3. The apparatus of any one of Aspects 1 to 2, wherein the XR interface device is a mobile device that is coupled to the apparatus using a local communication interface.

Aspect 4. The apparatus of any one of Aspects 1 to 3, wherein the apparatus is a mobile device that is coupled to the XR interface device using a local communication interface.

Aspect 5. The apparatus of any one of Aspects 1 to 4, wherein the XR processing device includes a server.

Aspect 6. The apparatus of any one of Aspects 1 to 5, wherein the XR processing device includes an edge node.

Aspect 7. The apparatus of any one of Aspects 1 to 6, wherein the sensor data received from the XR interface device and sent to the XR processing device includes compressed sensor data.

Aspect 8. The apparatus of any one of Aspects 1 to 7, wherein the at least one processor is configured to: compress at least a portion of the sensor data before sending the sensor data to the XR processing device, wherein at least the portion of the sensor data is uncompressed as received from the XR interface device.

Aspect 9. The apparatus of any one of Aspects 1 to 8, wherein, to generate the processing instructions based on the receipt of the sensor data from the XR interface device, the at least one processor is configured to: generate at least a subset of the processing instructions based on an uncompressed portion of the sensor data that is uncompressed as received from the XR interface device, wherein a compressed portion of the sensor data that is compressed as received from the XR interface device.

Aspect 10. The apparatus of any one of Aspects 1 to 9, wherein, to generate the processing instructions based on the receipt of the sensor data from the XR interface device, the at least one processor is configured to: generate at least a subset of the processing instructions based on at least one characteristic of a local communication interface between the apparatus and the XR interface device over which the sensor data is received from the XR interface device, wherein the at least one characteristic includes at least one of a bandwidth, a bitrate, a baud rate, a transfer speed, a transfer protocol, an encryption scheme, a connection quality, or a security scheme.

Aspect 11. The apparatus of any one of Aspects 1 to 10, wherein, to generate the processing instructions based on the receipt of the sensor data from the XR interface device, the at least one processor is configured to: generate at least a subset of the processing instructions based on at least one characteristic of the sensor data as received from the XR interface device, wherein the at least one characteristic includes at least one of a file size, an image size, an image resolution, a frame rate, an amount of channels, an encoding scheme, or an encryption scheme.

Aspect 12. The apparatus of any one of Aspects 1 to 11, wherein, to generate the processing instructions based on the receipt of the sensor data from the XR interface device, the at least one processor is configured to: generate at least a subset of the processing instructions based on at least one characteristic of the XR interface device, wherein the at least one characteristic includes at least one of an image capture resolution, an image capture size, an image capture color space, an image display resolution, an image display size, an image display color space, a pose, a location, an orientation, a bandwidth, a bit rate, a baud rate, a transfer speed, a transfer protocol, an encryption scheme, a security scheme, a temperature, or a battery level.

Aspect 13. The apparatus of any one of Aspects 1 to 12, wherein, to generate the processing instructions based on the receipt of the sensor data from the XR interface device, the at least one processor is configured to: generate at least a subset of the processing instructions based on at least one characteristic of the XR processing device, wherein the at least one characteristic includes at least one of a capability, a capacity, a processing power, a bandwidth, a bit rate, a baud rate, a transfer speed, a transfer protocol, an encryption scheme, or a security scheme.

Aspect 14. The apparatus of any one of Aspects 1 to 13, wherein the processing instructions are indicative of at least a pose of virtual content to be rendered as part of the XR content, wherein the virtual content is associated with a video game.

Aspect 15. The apparatus of any one of Aspects 1 to 14, wherein a portion of the layer content is configured to be overlaid over at least a portion of the XR content in the layered arrangement.

Aspect 16. The apparatus of any one of Aspects 1 to 15, wherein at least a portion of the XR content is configured to be overlaid over at least a portion of the layer content in the layered arrangement.

Aspect 17. The apparatus of any one of Aspects 1 to 16, wherein the at least one processor is configured to: manage an application programming interface (API), wherein the receipt of the sensor data from the XR interface device is associated with a first API call to the API, and wherein the receipt of the XR content from the XR processing device is associated with a second API call to the API.

Aspect 18. A method for extended reality (XR) management, the method comprising: receiving sensor data from an XR interface device having at least one sensor; generating, based on the receipt of the sensor data from the XR interface device, processing instructions for an XR processing device to process the sensor data to generate XR content; sending the sensor data and the processing instructions to the XR processing device; receiving the XR content from the XR processing device; generating layer content; and sending the XR content and the layer content to the XR interface device for the XR interface device to output the XR content and the layer content in a layered arrangement.

Aspect 19. The method of Aspect 18, wherein the XR interface device is a headset that is coupled to the apparatus using a local communication interface.

Aspect 20. The method of any one of Aspects 18 or 19, wherein the XR interface device is a mobile device that is coupled to the apparatus using a local communication interface.

Aspect 21. The method of any one of Aspects 18 to 20, wherein the method is performed by a mobile device that is coupled to the XR interface device using a local communication interface.

Aspect 22. The method of any one of Aspects 18 to 21, wherein the XR processing device includes a server.

Aspect 23. The method of any one of Aspects 18 to 22, wherein the XR processing device includes an edge node.

Aspect 24. The method of any one of Aspects 18 to 23, wherein the sensor data received from the XR interface device and sent to the XR processing device includes compressed sensor data.

Aspect 25. The method of any one of Aspects 18 to 24, further comprising: compressing at least a portion of the sensor data before sending the sensor data to the XR processing device, wherein at least the portion of the sensor data is uncompressed as received from the XR interface device.

Aspect 26. The method of any one of Aspects 18 to 25, wherein generating the processing instructions includes generating at least a subset of the processing instructions based on an uncompressed portion of the sensor data that is uncompressed as received from the XR interface device, wherein a compressed portion of the sensor data that is compressed as received from the XR interface device.

Aspect 27. The method of any one of Aspects 18 to 26, wherein generating the processing instructions based on the receipt of the sensor data from the XR interface device comprises: generating at least a subset of the processing instructions based on at least one characteristic of a local communication interface between the apparatus and the XR interface device over which the sensor data is received from the XR interface device, wherein the at least one characteristic includes at least one of a bandwidth, a bitrate, a baud rate, a transfer speed, a transfer protocol, an encryption scheme, a connection quality, or a security scheme.

Aspect 28. The method of any one of Aspects 18 to 27, wherein generating the processing instructions based on the receipt of the sensor data from the XR interface device comprises: generating at least a subset of the processing instructions based on at least one characteristic of the sensor data as received from the XR interface device, wherein the at least one characteristic includes at least one of a file size, an image size, an image resolution, a frame rate, an amount of channels, an encoding scheme, or an encryption scheme.

Aspect 29. The method of any one of Aspects 18 to 29, wherein generating the processing instructions based on the receipt of the sensor data from the XR interface device comprises: generating at least a subset of the processing instructions based on at least one characteristic of the XR interface device, wherein the at least one characteristic includes at least one of an image capture resolution, an image capture size, an image capture color space, an image display resolution, an image display size, an image display color space, a pose, a location, an orientation, a bandwidth, a bit rate, a baud rate, a transfer speed, a transfer protocol, an encryption scheme, a security scheme, a temperature, or a battery level.

Aspect 30. The method of any one of Aspects 18 to 29, wherein generating the processing instructions based on the receipt of the sensor data from the XR interface device comprises: generate at least a subset of the processing instructions based on at least one characteristic of the XR processing device, wherein the at least one characteristic includes at least one of a capability, a capacity, a processing power, a bandwidth, a bit rate, a baud rate, a transfer speed, a transfer protocol, an encryption scheme, or a security scheme.

Aspect 31. The method of any one of Aspects 18 to 30, wherein the processing instructions are indicative of at least a pose of virtual content to be rendered as part of the XR content, wherein the virtual content is associated with a video game.

Aspect 32. The method of any one of Aspects 18 to 31, wherein a portion of the layer content is configured to be overlaid over at least a portion of the XR content in the layered arrangement.

Aspect 33. The method of any one of Aspects 18 to 32, wherein at least a portion of the XR content is configured to be overlaid over at least a portion of the layer content in the layered arrangement.

Aspect 34. The method of any one of Aspects 18 to 33, further comprising: managing an application programming interface (API), wherein the receipt of the sensor data from the XR interface device is associated with a first API call to the API, and wherein the receipt of the XR content from the XR processing device is associated with a second API call to the API.

Aspect 35. The method of any one of Aspects 18 to 19, wherein receiving the sensor data from the XR interface device includes receiving the sensor data from the XR interface device over a local communication interface, wherein sending the XR content and the layer content to the XR interface device includes sending the XR content and the layer content to the XR interface device over the local communication interface, and wherein generating the processing instructions includes generating at least a subset of the processing instructions based on at least one characteristic of the local communication interface, wherein the at least one characteristic includes at least one of a bandwidth, a bitrate, a baud rate, a transfer speed, a transfer protocol, an encryption scheme, a connection quality, or a security scheme.

Aspect 36. A non-transitory computer-readable medium having stored thereon instructions that, when executed by one or more processors, cause the one or more processors to perform operations according to any of Aspects 18 to 35.

Aspect 37. An apparatus for extended reality (XR), the apparatus comprising one or more means for performing operations according to any of Aspects 18 to 35.

What is claimed is:

1. An apparatus for extended reality (XR) management, the apparatus comprising:

at least one memory; and at least one processor coupled to the at least one memory, the at least one processor configured to:

receive compressed sensor data from an XR interface device having at least one sensor;

generate, based on receipt of the compressed sensor data from the XR interface device and without decompressing the compressed sensor data, processing instructions for an XR processing device to process the compressed sensor data;

send the compressed sensor data and the processing instructions to the XR processing device without decompressing the compressed sensor data;

receive compressed XR content from the XR processing device, the compressed XR content generated by the XR processing device based on decompression and processing of the compressed sensor data according to the processing instructions at the XR processing device;

generate layer content corresponding to the compressed XR content without decompressing the compressed XR content; and send the compressed XR content and the layer content to the XR interface device without decompressing the compressed XR content to cause the XR interface device to output a decompressed variant of the compressed XR content and the layer content in a layered arrangement.

2. The apparatus of claim 1, wherein the XR interface device is a headset that is coupled to the apparatus using a local communication interface.

3. The apparatus of claim 1, wherein the XR interface device is a mobile device that is coupled to the apparatus using a local communication interface.

4. The apparatus of claim 1, wherein the apparatus is a mobile device that is coupled to the XR interface device using a local communication interface.

5. The apparatus of claim 1, wherein the XR processing device includes a server.

6. The apparatus of claim 1, wherein the XR processing device includes an edge node.

7. The apparatus of claim 1, wherein the compressed sensor data received from the XR interface device and sent to the XR processing device includes compressed image data.

8. The apparatus of claim 1, wherein the at least one processor is configured to:

receive uncompressed data from the XR interface device;

compress the uncompressed data to generate additional compressed data; and send the additional compressed data to the XR processing device before receiving the compressed XR content from the XR processing device.

9. The apparatus of claim 1, wherein, to generate the processing instructions based on the receipt of the compressed sensor data from the XR interface device, the at least one processor is configured to:

generate the processing instructions based on the compressed sensor data and uncompressed data received from the XR interface device.

10. The apparatus of claim 1, wherein, to generate the processing instructions based on the receipt of the compressed sensor data from the XR interface device, the at least one processor is configured to:

generate at least a subset of the processing instructions based on at least one characteristic of a local communication interface between the apparatus and the XR interface device over which the compressed sensor data is received from the XR interface device, wherein the at least one characteristic includes at least one of a bandwidth, a bitrate, a baud rate, a transfer speed, a transfer protocol, an encryption scheme, a connection quality, or a security scheme.

11. The apparatus of claim 1, wherein, to generate the processing instructions based on the receipt of the compressed sensor data from the XR interface device, the at least one processor is configured to:

generate at least a subset of the processing instructions based on at least one characteristic of the compressed sensor data as received from the XR interface device, wherein the at least one characteristic includes at least one of a file size, an image size, an image resolution, a frame rate, an amount of channels, an encoding scheme, or an encryption scheme.

12. The apparatus of claim 1, wherein, to generate the processing instructions based on the receipt of the compressed sensor data from the XR interface device, the at least one processor is configured to:

generate at least a subset of the processing instructions based on at least one characteristic of the XR interface device, wherein the at least one characteristic includes at least one of an image capture resolution, an image capture size, an image capture color space, an image display resolution, an image display size, an image display color space, a pose, a location, an orientation, a bandwidth, a bit rate, a baud rate, a transfer speed, a transfer protocol, an encryption scheme, a security scheme, a temperature, or a battery level.

13. The apparatus of claim 1, wherein, to generate the processing instructions based on the receipt of the compressed sensor data from the XR interface device, the at least one processor is configured to:

generate at least a subset of the processing instructions based on at least one characteristic of the XR processing device, wherein the at least one characteristic includes at least one of a capability, a capacity, a processing power, a bandwidth, a bit rate, a baud rate, a transfer speed, a transfer protocol, an encryption scheme, or a security scheme.

14. The apparatus of claim 1, wherein the processing instructions are indicative of at least a pose of virtual content to be rendered as part of the decompressed variant of the compressed XR content, wherein the virtual content is associated with a video game.

15. The apparatus of claim 1, wherein a portion of the layer content is configured to be overlaid over at least a portion of the decompressed variant of the compressed XR content according to the layered arrangement.

16. The apparatus of claim 1, wherein at least a portion of the decompressed variant of the compressed XR content is configured to be overlaid over at least a portion of the layer content according to the layered arrangement.

17. The apparatus of claim 1, wherein the at least one processor is configured to:

manage an application programming interface (API), wherein the receipt of the compressed sensor data from the XR interface device is associated with a first API call to the API, and wherein the receipt of the compressed XR content from the XR processing device is associated with a second API call to the API.

18. A method for extended reality (XR) management, the method comprising:

receiving compressed sensor data from an XR interface device having at least one sensor;

generating, based on receipt of the compressed sensor data from the XR interface device and without decompressing the compressed sensor data, processing instructions for an XR processing device to process the compressed sensor data;

sending the compressed sensor data and the processing instructions to the XR processing device without decompressing the compressed sensor data;

receiving compressed XR content from the XR processing device, the compressed XR content generated by the XR processing device based on decompression and processing of the compressed sensor data according to the processing instructions at the XR processing device;

generating layer content corresponding to the compressed XR content without decompressing the compressed XR content; and sending the compressed XR content and the layer content to the XR interface device without decompressing the compressed XR content to cause the XR interface device to output a decompressed variant of the compressed XR content and the layer content in a layered arrangement.

19. The method of claim 18, wherein generating the processing instructions includes generating the processing instructions based on the compressed sensor data and uncompressed data received from the XR interface device.

20. The method of claim 18, wherein receiving the compressed sensor data from the XR interface device includes receiving the compressed sensor data from the XR interface device over a local communication interface, wherein sending the compressed XR content and the layer content to the XR interface device includes sending the compressed XR content and the layer content to the XR interface device over the local communication interface, and wherein generating the processing instructions includes generating at least a subset of the processing instructions based on at least one characteristic of the local communication interface, wherein the at least one characteristic includes at least one of a bandwidth, a bitrate, a baud rate, a transfer speed, a transfer protocol, an encryption scheme, a connection quality, or a security scheme.

\* \* \* \* \*